(12) United States Patent
Okada et al.

(10) Patent No.: US 9,947,483 B2
(45) Date of Patent: Apr. 17, 2018

(54) DYE-SENSITIZED SOLAR CELL ELEMENT

(71) Applicant: FUJIKURA, LTD., Tokyo (JP)

(72) Inventors: Kenichi Okada, Chiba (JP); Katsuyoshi Endoh, Chiba (JP); Hiroki Usui, Chiba (JP); Ong-on Topon, Chiba (JP)

(73) Assignee: FUJIKURA LTD., Tokyo (JP)

(*) Notice: Subject to any disclaimer, the term of this patent is extended or adjusted under 35 U.S.C. 154(b) by 186 days.

(21) Appl. No.: 14/422,236

(22) PCT Filed: Aug. 31, 2013

(86) PCT No.: PCT/JP2013/073454
§ 371 (c)(1),
(2) Date: Feb. 18, 2015

(87) PCT Pub. No.: WO2014/034914
PCT Pub. Date: Mar. 6, 2014

(65) Prior Publication Data
US 2015/0243447 A1 Aug. 27, 2015

(30) Foreign Application Priority Data
Sep. 1, 2012 (JP) .................. 2012-192703
Sep. 1, 2012 (JP) .................. 2012-192704
(Continued)

(51) Int. Cl.
H01L 31/00 (2006.01)
H01G 9/20 (2006.01)

(52) U.S. Cl.
CPC ......... H01G 9/2077 (2013.01); H01G 9/2081 (2013.01); H01G 9/2031 (2013.01); H01G 9/2059 (2013.01); Y02E 10/542 (2013.01)

(58) Field of Classification Search
CPC .. H01G 9/2077; H01G 9/2081; H01G 9/2031; H01G 9/2059
See application file for complete search history.

(56) References Cited

U.S. PATENT DOCUMENTS
2012/0103400 A1 5/2012 Chiba et al.

FOREIGN PATENT DOCUMENTS
CN 102396101 A 3/2012
CN 102598402 A 7/2012
(Continued)

OTHER PUBLICATIONS
Japanese Office Action dated Sep. 29, 2015 in corresponding Japanese Patent Application No. 2014-533141.
(Continued)

Primary Examiner — Shannon Gardner
(74) Attorney, Agent, or Firm — Sughrue Mion, PLLC

(57) ABSTRACT

A dye-sensitized solar cell element has at least one dye-sensitized solar cell, the dye-sensitized solar cell is equipped with a conductive substrate having a transparent substrate and a transparent conductive layer provided on one surface of the transparent substrate, a counter substrate facing the conductive substrate, an oxide semiconductor layer provided on the conductive substrate or the counter substrate, and an annular sealing portion bonding the conductive substrate and the counter substrate. The transparent conductive layer has a main body portion disposed on an inner side of the sealing portion, a groove is formed in the transparent conductive layer, and at least a part of the groove has a first groove formed along an external shape of the sealing portion, and an insulating material also continuously covers an edge portion of the main body portion as well as enters into at least a part of the first groove.

10 Claims, 13 Drawing Sheets

(30) Foreign Application Priority Data

Sep. 1, 2012 (JP) ................................. 2012-192705
Mar. 30, 2013 (JP) ................................. 2013-075456

(56) References Cited

FOREIGN PATENT DOCUMENTS

| | | |
|---|---|---|
| EP | 1 933 344 A2 | 6/2008 |
| EP | 2421084 A1 | 2/2012 |
| EP | 2498330 A1 | 9/2012 |
| EP | 2 634 857 A1 | 9/2013 |
| EP | 2683020 A1 | 1/2014 |
| JP | 2005216663 A | 8/2005 |
| JP | 2006-100069 A | 4/2006 |
| JP | 2006-324090 A | 11/2006 |
| JP | 2006-324099 A | 11/2006 |
| JP | 2008-153013 A | 7/2008 |
| JP | 2009-181791 A | 8/2009 |
| JP | 2010-003557 A | 1/2010 |
| JP | 2011-48974 A | 3/2011 |
| WO | 2012/057006 A1 | 5/2012 |
| WO | 2012/118028 A1 | 9/2012 |

OTHER PUBLICATIONS

Communication dated Apr. 5, 2016 from the European Patent Office issued in corresponding Application No. 13833131.9.
Communication dated Jul. 5, 2016, issued by the State Intellectual Property Office of the P.R.C. in corresponding Chinese Application No. 201380032283.1.
International Search Report of PCT/JP2013/073454 dated Nov. 19, 2013.

DYE-SENSITIZED SOLAR CELL ELEMENT

CROSS REFERENCE TO RELATED APPLICATIONS

This is a National Stage of International Application No. PCT/JP2013/073454 filed Aug. 31, 2013, claiming priority based on Japanese Patent Application No. 2012-192703 filed Sep. 1, 2012, Japanese Patent Application No. 2012-192704 filed Sep. 1, 2012, Japanese Patent Application No. 2012-192705 filed Sep. 1, 2012, and Japanese Patent Application No. 2013-075456 filed Mar. 30, 2013, the contents of all of which are incorporated herein by reference in their entirety.

TECHNICAL FIELD

The present invention relates to a dye-sensitized solar cell element.

BACKGROUND ART

As a photoelectric conversion element, a dye-sensitized solar cell element has attracted attention since it is inexpensive and a high photoelectric conversion efficiency can be obtained, and various developments have been conducted with regard to the dye-sensitized solar cell element.

The dye-sensitized solar cell element is generally equipped with a dye-sensitized solar cell, and the dye-sensitized solar cell is equipped with a working electrode, a counter electrode, and an annular sealing portion to couple the working electrode and the counter electrode. In addition, the working electrode has a transparent substrate and a transparent conductive layer formed thereon.

As such a dye-sensitized solar cell element, for example, an element described in the following Patent Document 1 is known. In the following Patent Document 1, a dye-sensitized solar cell module having a plurality of dye-sensitized solar cells connected in series is disclosed. In the dye-sensitized solar cell module of the following Patent Document 1, the plurality of dye-sensitized solar cells have a substrate and a conductive film provided on the substrate, the conductive films included in the plurality of dye-sensitized solar cells are disposed on the substrate via a groove formed by a laser scribing method or the like, and a porous insulating layer containing a carrier transporting material containing a redox species enter into the groove.

In addition, as a dye-sensitized solar cell element, an element described in the following Patent Document 2 is also known. In the following Patent Document 2, disclosed is a photoelectric conversion device having a dye-sensitized solar cell having a pair of electrodes, an electrolyte layer provided between the pair of those electrodes, and a sealing material to couple the pair of electrodes around the electrolyte layer, and a back sheet provided so as to cover one electrode of the pair of electrodes and to be adhered to the sealing material.

CITATION LIST

Patent Document

Patent Document 1: JP 2010-3557 A
Patent Document 2: JP 2006-100069 A

SUMMARY OF THE INVENTION

Problem to be Solved by the Invention

However, there is a room for improvement in terms of durability in the dye-sensitized solar cell modules described in Patent Documents 1 and 2 above.

The invention has been achieved in view of the above circumstance, and an object thereof is to provide a dye-sensitized solar cell element exhibiting excellent durability.

Means for Solving Problem

The present inventors have conducted investigations on the factor causing the above problem in the dye-sensitized solar cell module of Patent Document 1 above. As a result, it has been noticed that there is a case in which a crack is formed inside the substrate and downward the groove when the groove formed between the conductive films is formed on the substrate by a laser scribing method or the like, and this crack reaches to the conductive film surface. Here, the present inventors have considered that moisture penetrates from the outside of the sealing portion via the crack when the groove communicates with the outside of the sealing portion included in the dye-sensitized solar cell, this moisture comes into contact with the carrier transporting material in the porous insulating layer, and as a result, the durability of the dye-sensitized solar cell module may deteriorate. Consequently, the present inventors have conducted intensive investigations, and as a result, have found that the above problem can be solved by the following invention.

In other words, the invention is a dye-sensitized solar cell element including at least one dye-sensitized solar cell, in which the dye-sensitized solar cell is equipped with a conductive substrate having a transparent substrate and a transparent conductive layer provided on one surface of the transparent substrate, a counter substrate facing the conductive substrate, an oxide semiconductor layer provided on the conductive substrate or the counter substrate, and an annular sealing portion bonding the conductive substrate and the counter substrate, the transparent conductive layer has a main body portion disposed on an inner side of the sealing portion, a groove is formed in the transparent conductive layer, and at least a part of the groove has a first groove formed along an external shape of the sealing portion, and an insulating material also continuously covers an edge portion of the main body portion as well as enters into at least a part of the first groove. Hereinafter, the invention is referred to as the "first invention" in some cases.

According to this dye-sensitized solar cell element, a groove is formed in the transparent conductive layer, and this groove has a first groove formed along the external shape of the annular sealing portion. In addition, an insulating material enters into at least a part of the first groove, and also this insulating material continuously covers the edge portion of the main body portion as well. For this reason, even if a crack is formed inside the transparent substrate and at the position downward the groove along the groove and the crack continues to the edge portion of the main body portion, the penetration of moisture, which has passed through the crack, from the outside of the sealing portion is sufficiently suppressed by the insulating material. For this reason, according to the dye-sensitized solar cell element, it is possible to exhibit excellent durability.

In the dye-sensitized solar cell element, it is preferable that the insulating material be provided over the entire circumference along an external shape of the sealing portion.

In this case, it is possible to exhibit more excellent durability since the penetration path of moisture from the outside can be blocked over the entire circumference.

In the dye-sensitized solar cell element, it is preferable that at least a part of the first groove be spaced apart from the sealing portion on an outer side of the sealing portion, and the dye-sensitized solar cell element have a current collecting wiring on the transparent conductive layer of the at least one dye-sensitized solar cell and between the sealing portion and the first groove.

In this case, it is possible to extract the current generated on the inner side of the sealing portion of the at least one dye-sensitized solar cell to the outer side of the sealing portion by the current collecting wiring. In addition, it is possible to sufficiently suppress that gas such as water vapor penetrates into the inner side of the sealing portion through the current collecting wiring when the current collecting wiring is disposed between the sealing portion and the first groove on the outer side of the sealing portion although the current collecting wiring generally exhibits air permeability since it is porous and thus gas such as water vapor is permeable through it. For this reason, more excellent durability is obtained.

In a case in which the dye-sensitized solar cell element further includes a back sheet covering the dye-sensitized solar cell on the one surface side of the transparent substrate, it is preferable that the groove have the first groove and a second groove formed along an edge portion of a part excluding the main body portion of the transparent conductive layer and intersecting with a peripheral portion of the back sheet, and the insulating material also covers an edge portion of a part excluding the main body portion of the transparent conductive layer as well as enters into the second groove.

It is possible for the moisture to penetrate into the space between the back sheet and the transparent conductive substrate through the second groove when the second groove intersects with the peripheral portion of the back sheet. In this case, the penetration of moisture from the outer side of the back sheet into the inner side thereof is sufficiently suppressed since the insulating material enters into the second groove and the insulating material covers also the edge portion of the part excluding the main body portion of the transparent conductive layer. For this reason, it is sufficiently suppressed that the moisture which has penetrated into the space between the back sheet and the transparent conductive substrate enters into the inner side of the sealing portion through the sealing portion. For this reason, it is possible to sufficiently suppress the deterioration of the durability of the dye-sensitized solar cell element.

In the dye-sensitized solar cell element, it is preferable that an insulating coupling portion be provided on the conductive substrate and the entire circumference of a peripheral portion of the back sheet.

In this case, it is possible to sufficiently suppress that the moisture penetrates from the outer side of the back sheet into the inner side of the back sheet.

In the dye-sensitized solar cell element, it is preferable that the insulating material and the coupling portion be composed of the same material and integrated.

In this case, the insulating material and the coupling portion are composed of the same material and integrated, and thus it is possible to prevent the penetration of moisture by being integrated since the interface is not formed between the insulating material and the coupling portion even if the moisture penetrates into the back sheet. For this reason, it is possible to exhibit even more excellent superior durability.

In the dye-sensitized solar cell element, it is preferable that the insulating material cover an edge portion of the transparent conductive layer on both sides of the entire groove as well as enter into the entire groove.

In this case, the insulating material covers the edge portion of the transparent conductive layer on both sides of the entire groove as well as enters into the entire groove, and thus moisture cannot penetrate into the groove at all and moisture cannot penetrate into the crack formed on the groove as well, and it is possible to even more suppress that the moisture penetrates via the groove as a result. In addition, the insulating material covers also the edge portion of the transparent conductive layer on both sides of the entire groove and thus it is possible to sufficiently secure the insulation properties between the transparent conductive layers on both sides of the groove.

In a case in which the dye-sensitized solar cell element further includes a back sheet covering the at least one dye-sensitized solar cell on the one surface side of the transparent substrate, it is preferable that the back sheet have an adhesive portion making the back sheet adhere to the conductive substrate, and the adhesive portion be spaced apart from the sealing portion.

According to this dye-sensitized solar cell element, the adhesive portion of the back sheet is spaced apart from the sealing portion. For this reason, it is sufficiently suppressed that the sealing portion is stretched since the adhesive portion is constricted at a low temperature and thus an excessive stress is applied to the interface between the sealing portion and the transparent conductive substrate or the counter substrate. In addition, at a high temperature as well, it is sufficiently suppressed that the sealing portion is pressed since the adhesive portion expands and thus an excessive stress is applied to the interface between the sealing portion and the transparent conductive substrate or the counter substrate. In other words, according to the dye-sensitized solar cell element of the invention, it is sufficiently suppressed that an excessive stress is applied to the interface between the sealing portion and the transparent conductive substrate or the counter substrate both at a high temperature and a low temperature. For this reason, it is possible for the dye-sensitized solar cell element of the invention to exhibit excellent durability.

In the dye-sensitized solar cell element, it is preferable that an insulating coupling portion be provided on the conductive substrate and the entire circumference of a peripheral portion of the back sheet, and the adhesive portion of the back sheet be adhered to the coupling portion.

In this case, it is possible to sufficiently suppress that the moisture penetrates from the outer side of the back sheet into the inner side of the back sheet.

In the dye-sensitized solar cell element, it is preferable that the insulating material be provided between the sealing portion and the conductive substrate, the conductive substrate be constituted by a first electrode, and the counter substrate be constituted by a second electrode.

In this case, the contact of the conductive substrate constituted by the first electrode with the counter substrate constituted by the second electrode can be sufficiently suppressed even if the sealing portion exhibits fluidity at a high temperature, and thus the short circuit between the conductive substrate and the counter substrate can be sufficiently suppressed.

It is preferable that the dye-sensitized solar cell element have a plurality of the dye-sensitized solar cells, and the plurality of dye-sensitized solar cells be connected in series and electrically, among the plurality of dye-sensitized solar cells, the dye-sensitized solar cell connected with an adjacent dye-sensitized solar cell further include a connecting terminal provided on the transparent conductive layer, the counter substrate have a metal substrate, the transparent conductive layer have a main body portion provided on an inner side of the annular sealing portion and a protruding portion which protrudes from the main body portion to an outer side of the sealing portion and on which the connecting terminal is provided, the connecting terminal of one dye-sensitized solar cell of two adjacent dye-sensitized solar cells be connected with the metal substrate of the counter substrate of the other dye-sensitized solar cell via a conductive material, the connecting terminal have a conductive material connecting portion connected with the conductive material and extending along a fixed direction on an outer side of the sealing portion and a conductive material non-connecting portion extending along a fixed direction from the conductive material connecting portion on an outer side of the sealing portion, and a width of the conductive material non-connecting portion be narrower than a width of the conductive material connecting portion.

In a case in which the dye-sensitized solar cell element is placed in an environment in which the temperature change is great, the connecting terminal is less likely to peel off from the protruding portion of the transparent conductive layer as the width of the connecting terminal provided on the protruding portion of the transparent conductive layer is wider. With regard to that point, in the dye-sensitized solar cell element of the invention, the conductive material non-connecting portion of the connecting terminal has a narrower width than the conductive material connecting portion connected with the conductive material. For this reason, the conductive material non-connecting portion of the connecting terminal is less likely to peel off from the protruding portion of the transparent conductive layer. Hence, the conductive material non-connecting portion does not peel off from the protruding portion of the transparent conductive layer and thus it is possible to maintain the connection with the protruding portion even if the conductive material connecting portion peels off from the protruding portion of the transparent conductive layer. In addition, it is possible to normally operate the dye-sensitized solar cell element even if the conductive material connecting portion peels off from the protruding portion of the transparent conductive layer. Consequently, according to the dye-sensitized solar cell element of the invention, it is possible to improve the connection reliability. In addition, the conductive material connected with the metal substrate of the counter substrate of one dye-sensitized solar cell of two adjacent dye-sensitized solar cells is connected with the conductive material connecting portion on the protruding portion of the other dye-sensitized solar cell, and the conductive material connecting portion is provided on the protruding portion and the outer side of the sealing portion. In other words, the connection of two adjacent dye-sensitized solar cells is performed on the outer side of the sealing portion. For this reason, according to the dye-sensitized solar cell element of the invention, it is possible to improve the aperture ratio.

In addition, the present inventors have conducted investigations on the factor causing the above problem in the photoelectric conversion device of Patent Document 2 above. As a result, in the photoelectric conversion device of Patent Document 2 above, a hot melt resin having a great linear expansion coefficient is used as the adhesive portion included in the back seat, and for that reason, it is considered that the sealing material is stretched since the hot melt resin is constricted at a low temperature and thus an excessive stress is applied to the interface between the sealing material and the electrode. In contrast, at a high temperature, it is considered that the sealing material is pressed since the hot melt resin expands and thus an excessive stress is applied to the sealing material and the electrode. The present inventors have considered that adhesive force between the sealing material and the electrode is weakened as a result, the moisture is likely to penetrate, and thus the durability is likely to decrease. Consequently, the present inventors have conducted intensive investigations and found that the above problem can also be solved by the following invention as a result.

In other words, the invention is a dye-sensitized solar cell element which has at least one dye-sensitized solar cell and a back sheet disposed to face the at least one dye-sensitized solar cell, and the dye-sensitized solar cell includes a conductive substrate, a counter substrate facing the conductive substrate, an oxide semiconductor layer provided on the conductive substrate ox the counter substrate, and an annular sealing portion bonding the conductive substrate and the counter substrate, the back sheet has an adhesive portion making the back sheet adhere to the conductive substrate, and the adhesive portion is spaced apart from the sealing portion. Hereinafter, the invention is referred to as the "second invention" in some cases.

According to this dye-sensitized solar cell element, the adhesive portion of the back sheet is spaced apart from the sealing portion. For this reason, it is sufficiently suppressed that the sealing portion is stretched since the adhesive portion is constricted at a low temperature and thus an excessive stress is applied to the interface between the sealing portion and the conductive substrate or the counter substrate. In addition, at a high temperature as well, it is sufficiently suppressed that the sealing portion is pressed since the adhesive portion expands and thus an excessive stress is applied to the interface between the sealing portion and the conductive substrate or the counter substrate. In other words, according to the dye-sensitized solar cell element of the invention, it is sufficiently suppressed that an excessive stress is applied to the interface between the sealing portion and the conductive substrate or the counter substrate both at a high temperature and a low temperature. For this reason, it is possible for the dye-sensitized solar cell element of the invention to exhibit excellent durability.

In the dye-sensitized solar cell element, it is preferable that an insulating coupling portion be provided on the conductive substrate and the entire circumference of a peripheral portion of the back sheet, and the adhesive portion of the back sheet be adhered to the coupling portion.

In this case, it is possible to sufficiently suppress that the moisture penetrates from the outer side of the back sheet into the inner side of the back sheet.

In the dye-sensitized solar cell element, it is preferable that the conductive substrate be constituted by a first electrode, the counter substrate be constituted by a second electrode, and the insulating material be provided between the sealing portion and the conductive substrate.

In this case, the contact of the transparent conductive substrate constituted by the first electrode with the counter substrate constituted by the second electrode can be sufficiently suppressed even if the sealing portion exhibits fluidity at a high temperature, and thus the short circuit between the conductive substrate and the counter substrate can be sufficiently suppressed.

In the dye-sensitized solar cell element, it is preferable that the coupling portion and the insulating material be composed of the same material and integrated.

In this case, the coupling portion and the insulating material are composed of the same material and integrated, and thus it is possible to prevent the penetration of moisture since the interface is not formed between the insulating material and the coupling portion and thus the insulating material and the coupling portion are integrated even if the moisture penetrates into the back sheet. For this reason, it is possible to exhibit even more excellent durability.

Effect of the Invention

According to the invention, a dye-sensitized solar cell element exhibiting excellent durability is provided.

MODE(S) FOR CARRYING OUT THE INVENTION

Figure 1:
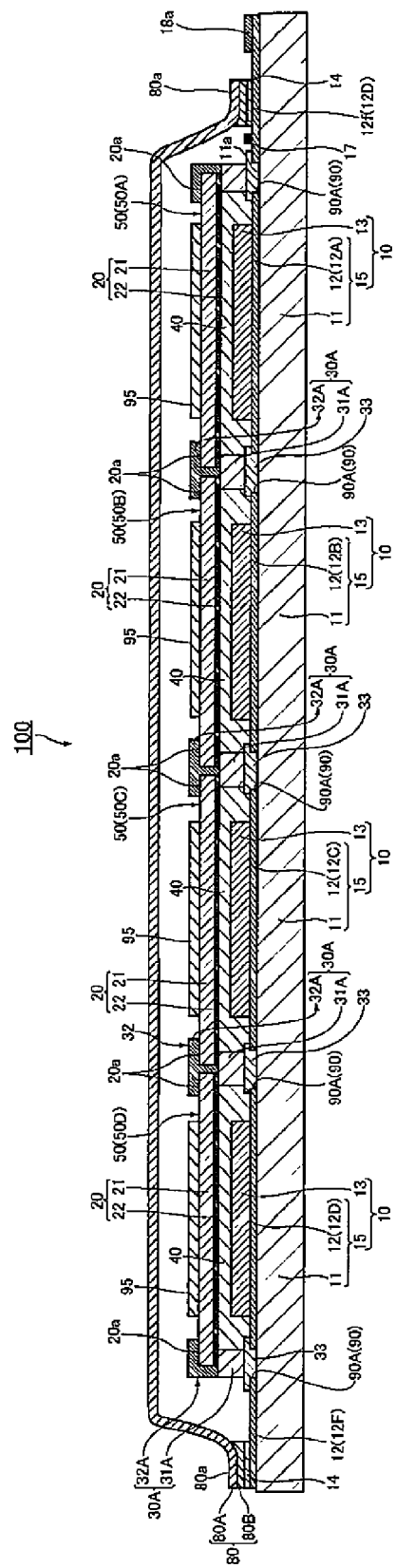
FIG. 1 is an end view of the cut section illustrating a first embodiment of a dye-sensitized solar cell element of the invention.
Figure 2:
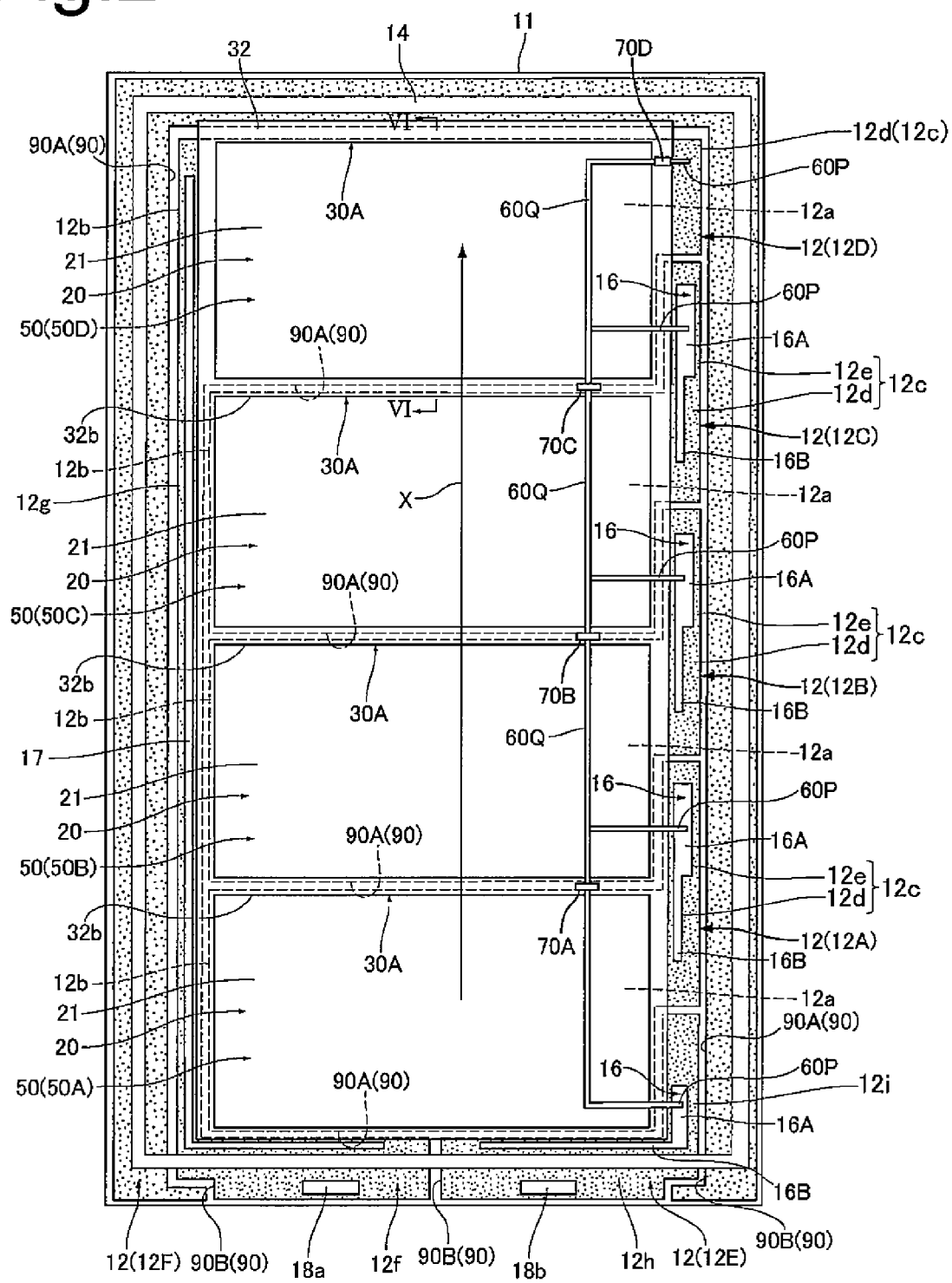
FIG. 2 is a plan view illustrating a part of a first embodiment of a dye-sensitized solar cell element of the invention.
Figure 3:
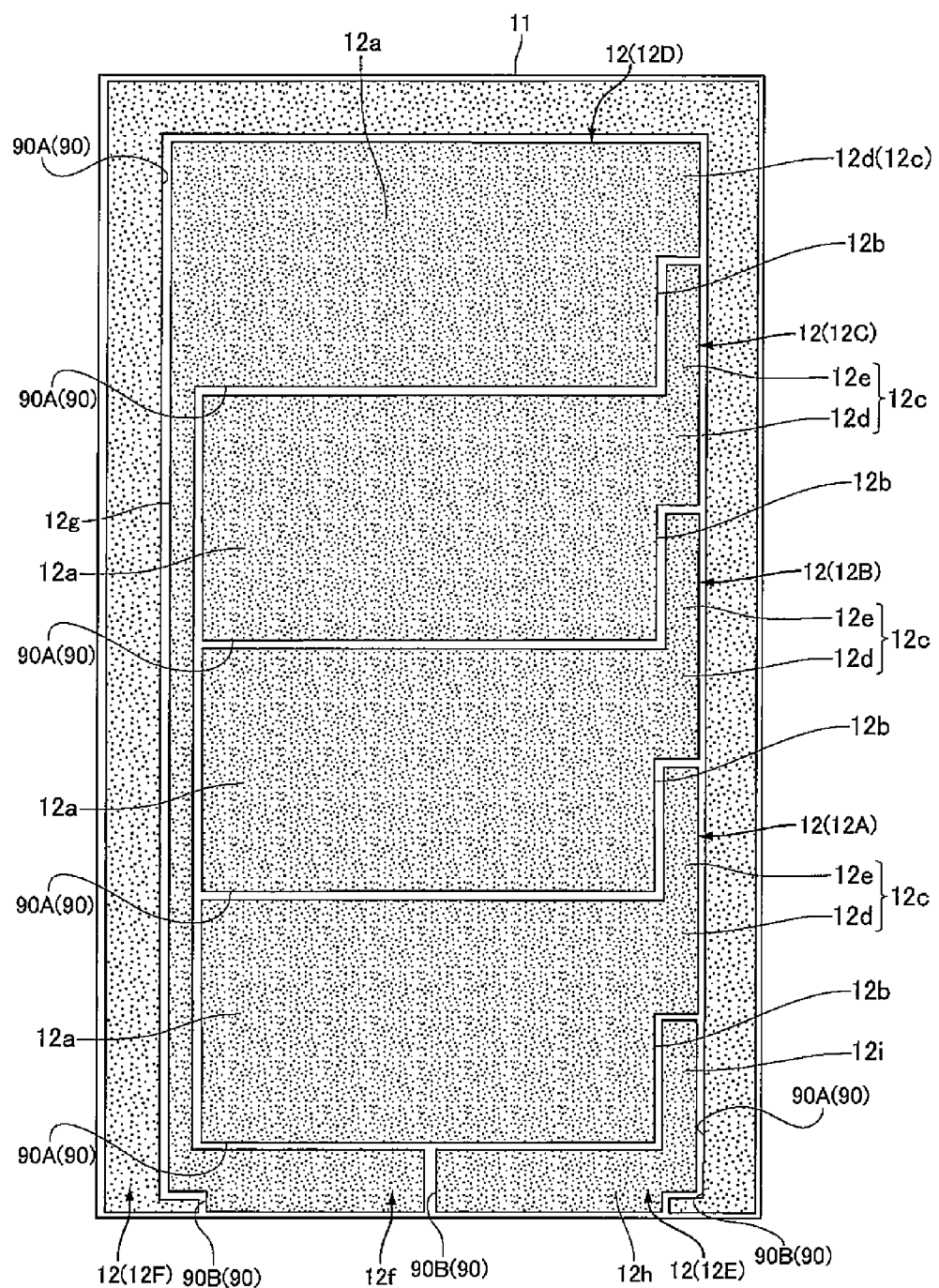
FIG. 3 is a plan view illustrating a pattern of a transparent conductive layer of a dye-sensitized solar cell element of FIG. 1.
Figure 4:
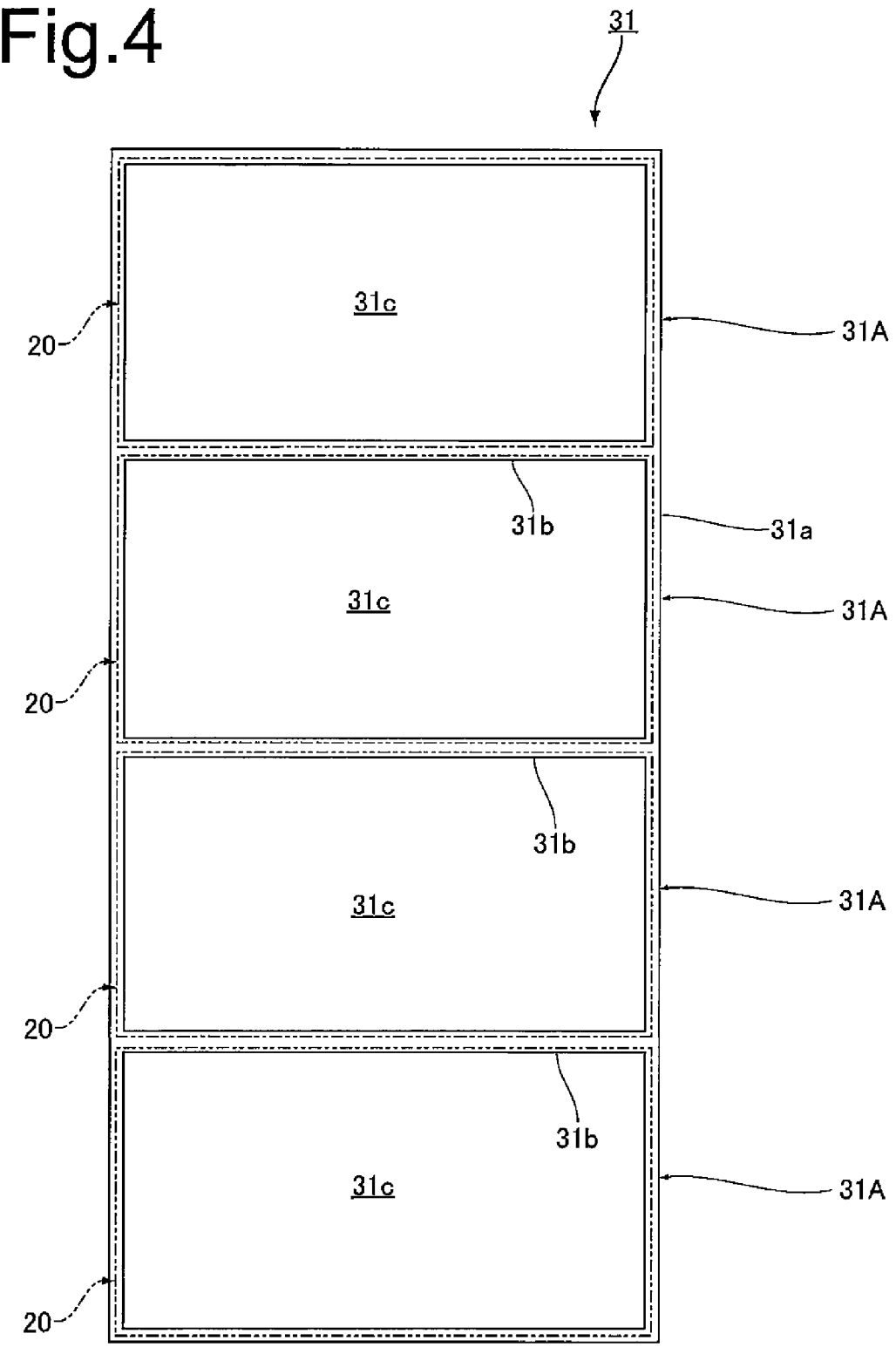
FIG. 4 is a plan view illustrating a first integrated sealing portion of FIG. 1.
Figure 5:
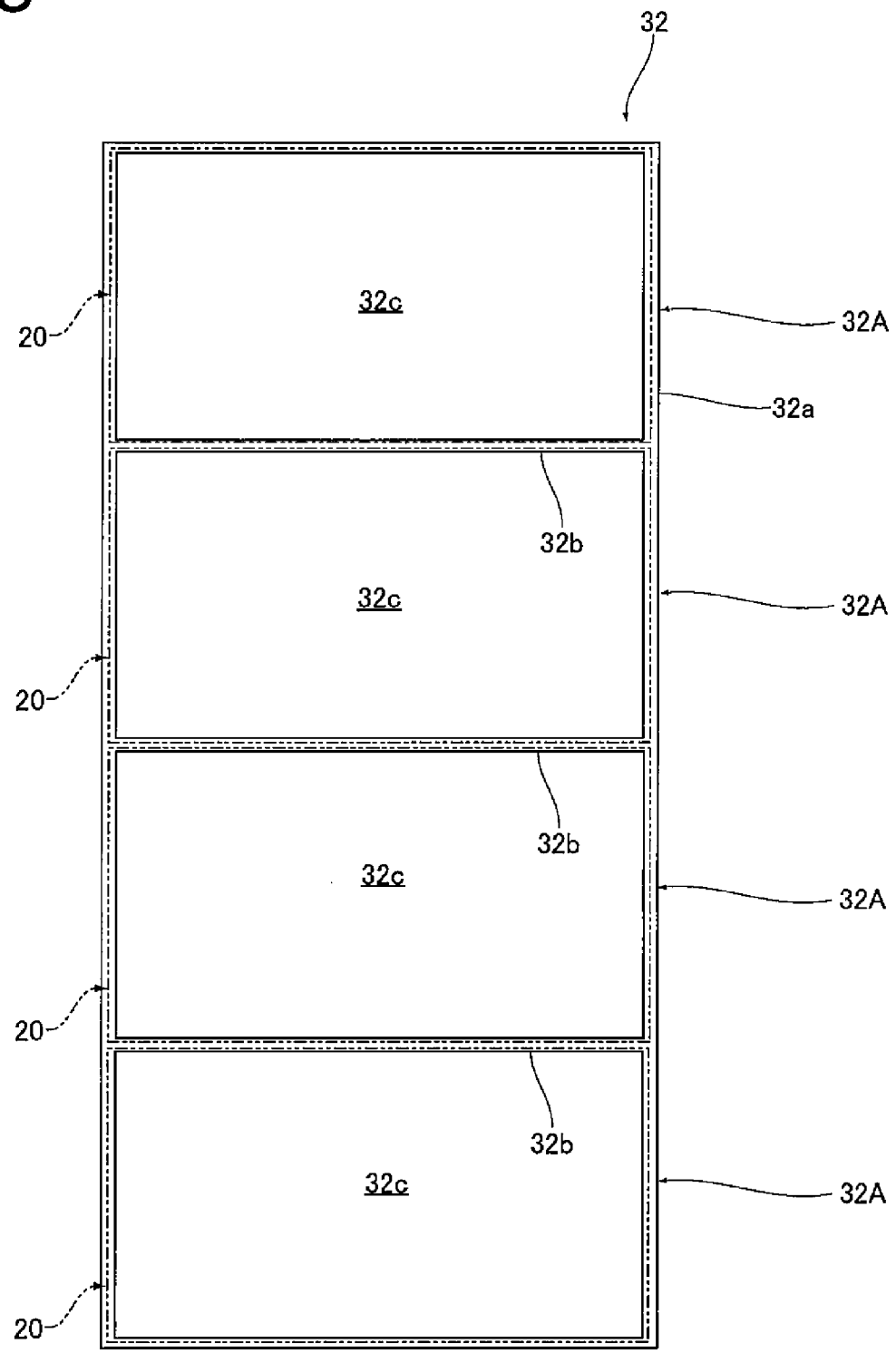
FIG. 5 is a plan view illustrating a second integrated sealing portion of FIG. 1.
Figure 6:
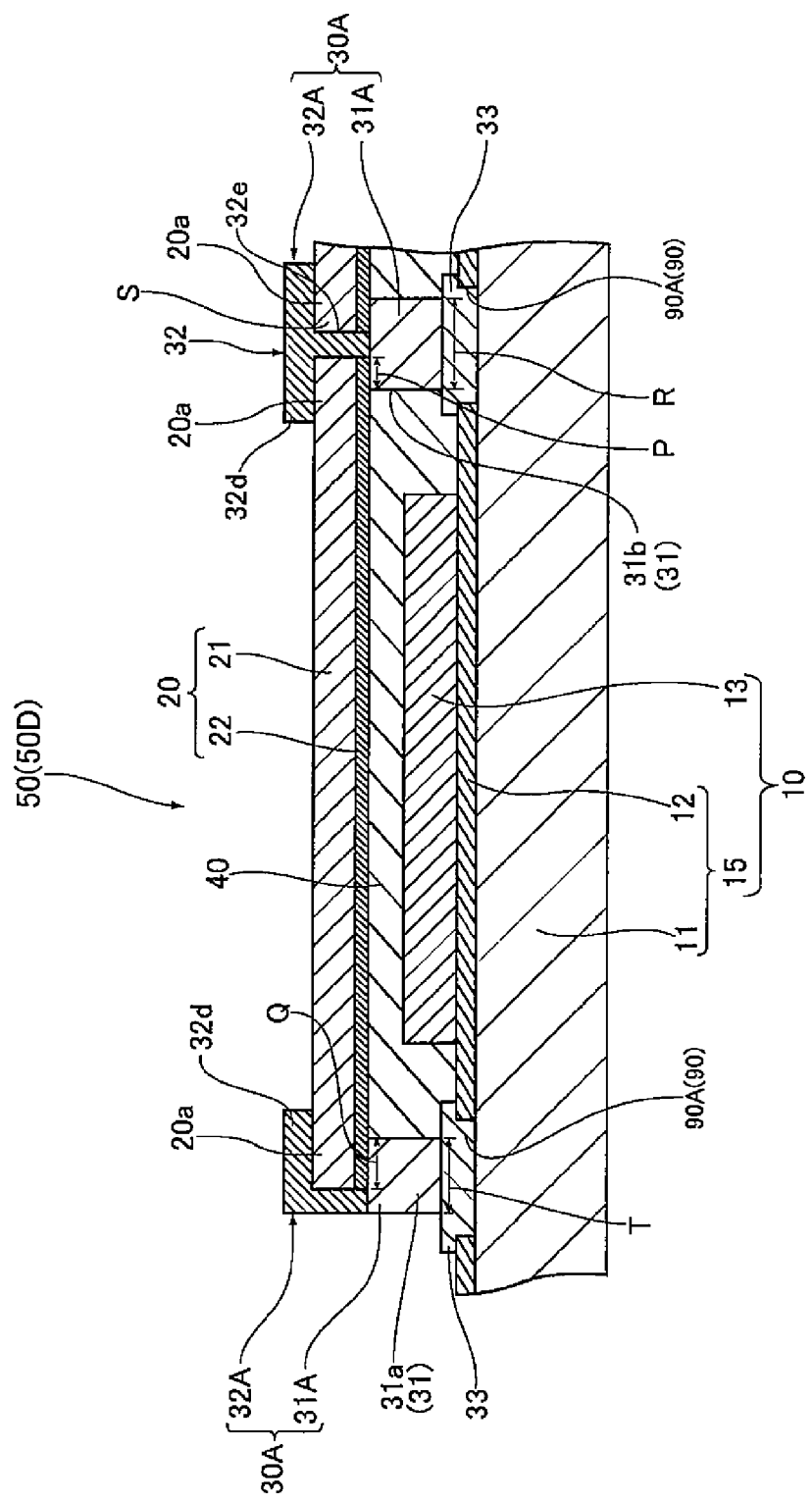
FIG. 6 is an end view of the cut section along the line VI-VI in FIG. 2.

Hereinafter, a preferred first embodiment of the dye-sensitized solar cell element of the invention will be described in detail with reference to FIG. 1 to FIG. 6. FIG. 1 is an end view of the cut section illustrating a first embodiment of a dye-sensitized solar cell element of the invention, FIG. 2 is a plan view illustrating a part of a first embodiment of a dye-sensitized solar cell element of the invention, FIG. 3 is a plan view illustrating a pattern of a transparent conductive layer of a dye-sensitized solar cell module of FIG. 1, FIG. 4 is a plan view illustrating a first integrated sealing portion of FIG. 1, FIG. 5 is a plan view illustrating a second integrated sealing portion of FIG. 1, and FIG. 6 is an end view of the cut section along the line VI-VI in FIG. 2.

As illustrated in FIG. 1, a dye-sensitized solar cell module (hereinafter, referred to as the "DSC Module" in some cases) 100 as a dye-sensitized solar cell element has a plurality (four in FIG. 1) of dye-sensitized solar cells (hereinafter, referred to as the "DSC" in some cases) 50 having a transparent substrate 11 and a back sheet 80 which is provided so as to cover the DSC 50 on the side of one surface 11a of the transparent substrate 11. An insulating coupling portion 14 is provided on the entire circumference of a peripheral portion 80a of the back sheet 80. As illustrated in FIG. 2, the plurality of DSCs 50 are connected in series by a conductive material 60P. Hereinafter, for convenience of description, the four DSCs 50 of the DSC module 100 are referred to as DSCs 50A to 50D in some cases.

As illustrated in FIG. 1, each of the plurality of DSCs 50 is equipped with a working electrode 10, a counter electrode 20 facing the working electrode 10, and an annular sealing portion 30A bonding the working electrode 10 and the counter electrode 20. An electrolyte 40 is filled in the cell space formed by the working electrode 10, the counter electrode 20, and the annular sealing portion 30A.

The counter electrode 20 is equipped with a metal substrate 21 and a catalyst layer 22 which is provided to the working electrode 10 side of the metal substrate 21 and promotes the catalytic reaction. In addition, in two adjacent DSCs 50, the counter electrodes 20 are spaced apart from each other. In the present embodiment, a counter substrate is constituted by the counter electrode 20.

As illustrated in FIG. 1 and FIG. 2, the working electrode 10 has a transparent conductive substrate 15 having a transparent substrate 11, a transparent conductive layer 12 provided on the transparent substrate 11 and an insulating material 33 provided on the one surface 11a of the transparent substrate 11, at least one oxide semiconductor layer 13 provided on the transparent conductive layer 12 of the transparent conductive substrate 15, and a connecting terminal 16 provided on the transparent conductive layer 12. The oxide semiconductor layer 13 is disposed on the inner side of the annular sealing portion 30A. The transparent substrate 11 is used as the common transparent substrate of the DSCs 50A to 50D. Meanwhile, in the present embodiment, a conductive substrate is constituted by the transparent conductive substrate 15.

As illustrated in FIG. 2 and FIG. 3, the transparent conductive layer 12 is constituted by the transparent conductive layers 12A to 12F provided in a state of being insulated from each other. In other words, the transparent conductive layers 12A to 12F are disposed to interpose a groove 90 between one another. Here, the transparent conductive layers 12A to 12D constitute the transparent conductive layer 12 of the plurality of DSCs 50A to 50D, respectively. In addition, the transparent conductive layer 12E is disposed so as to bend along the sealing portion 30A. The transparent conductive layer 12F is the annular transparent electrode film 12 for fixing the peripheral portion 80a of the back sheet 80 (see FIG. 1).

As illustrated in FIG. 3, all of the transparent conductive layers 12A to 12D have a quadrangular-shaped main body portion 12a having a side edge portion 12b and a protruding portion 12c which laterally protrudes from the side edge portion 12b of the main body portion 12a.

As illustrated in FIG. 2, the protruding portion 12c of the transparent conductive layer 12C among the transparent conductive layers 12A to 12D has a projecting portion 12d which laterally projects with respect to the arrangement direction X of the DSCs 50A to 50D and a facing portion 12e which extends from the projecting portion 12d and faces the main body portion 12a of the adjacent DSC 50D via the groove 90.

In the DSC 50B as well, the protruding portion 12c of the transparent conductive layer 12B has the projecting portion 12d and the facing portion 12e. In addition, in the DSC 50A as well, the protruding portion 12c of the transparent conductive layer 12A has the projecting portion 12d and the facing portion 12e.

Meanwhile, the DSC 50D is connected with the DSC 50C already and there is no other DSC 50 to be connected. For this reason, in the DSC 50D, the protruding portion 12c of the transparent conductive layer 12D does not have a facing portion 12e. In other words, the protruding portion 12c of the transparent conductive layer 12D is constituted by only the projecting portion 12d.

However, the transparent conductive layer 12D further has a first current extracting portion 12f for extracting the current generated in the DSC module 100 to the outside and a connecting portion 12g which connects the first current extracting portion 12f with the main body portion 12a and extends along the side edge portion 12b of the transparent conductive layers 12A to 12C. The first current extracting portion 12f is disposed in the vicinity of the DSC 50A and on the side opposite to the transparent conductive layer 12B with respect to the transparent conductive layer 12A.

On the other hand, the transparent conductive layer 12E also has a second current extracting portion 12h for extracting the current generated in the DSC module 100 to the outside, and the second current extracting portion 12h is disposed in the vicinity of the DSC 50A and on the side opposite to the transparent conductive layer 12B with respect to the transparent conductive layer 12A. In addition, the transparent conductive layer 12E further has a second connecting portion 12i connecting the second current extracting portion 12h and the metal substrate 21 of the counter electrode 20 of the DSC 50A. In the present embodiment, the second connecting portion 12i is disposed in an L-shape between the annular coupling portion 14 and the main body portion 12a of the transparent conductive layer 12A of the DSC 50A. Moreover, the first current extracting portion 12f and the second current extracting portion 12h are disposed in the vicinity of the DSC 50A via the groove 90 so as to be adjacent to each other. Here, the groove 90 is constituted by a first groove 90A formed along the external shape of the annular sealing portion 30A and a second groove 90B which is formed along the edge portion of the part excluding the main body portion 12a of the transparent conductive layer 12 and intersects with the peripheral portion 80a of the back sheet 80. The first groove 90A is formed along the external shape of the annular sealing portion 30A, and thus the first groove 90A also includes a groove formed along the edge portion of the part excluding the main body portion 12a of the transparent conductive layer 12 in addition to the groove formed along the edge portion of the main body portion 12a of the transparent conductive layer 12. In addition, the first groove 90A refers to the groove formed on the inner side than the inner periphery of the annular coupling portion 14 in a case in which the DSC module 100 has the back sheet 80, and the second groove 90B refers to the groove formed on the outer side of the inner periphery of the annular coupling portion 14.

In addition, the connecting terminal 16 is provided on each of the protruding portions 12c of the transparent conductive layers 12A to 12C and the transparent conductive layer 12E. In the present embodiment, in the transparent conductive layers 12A to 12C, at least a conductive material connecting portion 16A of the connecting terminal 16 is provided on the facing portion 12e of the protruding portion 12c and faces the main body portion 12a of the adjacent DSC 50 to be connected. In the transparent conductive layer 12E, the conductive material connecting portion 16A of the connecting terminal 16 faces the main body portion 12a of the adjacent DSC 50A to be connected. Each connecting terminal 16 has the conductive material connecting portion 16A which is connected with the conductive material 60P and extends along the sealing portion 30A on the outer side of the sealing portion 30A and a conductive material non-connecting portion 16B which is not connected with the conductive material 60P and extends from the conductive material connecting portion 16A along the sealing portion 30A on the outer side of the sealing portion 30A. Moreover, the width of the conductive material non-connecting portion 16B is narrower than the width of the conductive material connecting portion 16A. Here, the width of the conductive material connecting portion 16A and the width of the conductive material non-connecting portion 16B are constant, respectively. Meanwhile, the width of the conductive material connecting portion 16A means the length in the direction orthogonal to the extending direction of the conductive material connecting portion 16A and the narrowest width of the width of the conductive material connecting portion 16A, and the width of the conductive material non-connecting portion 16B means the length in the direction orthogonal to the extending direction of the conductive material non-connecting portion 16B and the narrowest width of the width of the conductive material non-connecting portion 16B.

In addition, the conductive material connecting portion 16A of the connecting terminal 16 provided on the protruding portion 12c of the transparent conductive layer 12C of the DSC 50C is connected with the metal substrate 21 of the counter electrode 20 of the adjacent DSC 50D via the conductive material 60P. The conductive material 60P is disposed so as to pass over the sealing portion 30A. In the same manner, the conductive material connecting portion 16A of the connecting terminal 16 of the DSC 50B is connected with the metal substrate 21 of the counter electrode 20 of the adjacent DSC 50C via the conductive material 60P, and the conductive material connecting portion 16A of the connecting terminal 16 of the DSC 50A is connected with the metal substrate 21 of the counter electrode 20 of the adjacent DSC 50B via the conductive material 60P. In addition, the conductive material connecting portion 16A of the connecting terminal 16 on the transparent conductive layer 12E is connected with the metal substrate 21 of the counter electrode 20 of the adjacent DSC 50A via the conductive material 60P.

In addition, external connecting terminals 18a and 18b are provided on the first current extracting portion 12f and the second current extracting portion 12h, respectively.

As illustrated in FIG. 1, the sealing portion 30A has an annular first sealing portion 31A provided between the transparent conductive substrate 15 and the counter electrode 20 and a second sealing portion 32A which is provided so as to be superimposed on the first sealing portion 31A and sandwiches an edge portion 20a of the counter electrode 20 together with the first sealing portion 31A. In addition, as illustrated in FIG. 4, the adjacent first sealing portions 31A are integrated so as to constitute a first integrated sealing portion 31. That is to say, the first integrated sealing portion 31 is constituted by an annular-shaped part 31a (hereinafter, referred to as the "annular portion") which is not provided between the two adjacent counter electrodes 20 and a part 31b (hereinafter, referred to as the "partitioning portion") which is provided between the two adjacent counter electrodes 20 and partitions an inner side opening 31c of the annular-shaped part 31a. In addition, as illustrated in FIG. 5, second sealing portions 32A are integrated between the adjacent counter electrodes 20 so as to constitute a second integrated sealing portion 32. The second integrated sealing portion 32 is constituted by an annular-shaped part 32a (hereinafter, referred to as the "annular portion") which is not provided between the two adjacent counter electrodes 20 and a part 32b (hereinafter, referred to as the "partitioning portion") which is provided between the two adjacent counter electrodes 20 and partitions an inner side opening 32c of the annular-shaped part 32a.

In addition, as illustrated in FIG. 1, between the first sealing portion 31A and the groove 90, an insulating material 33 is provided on the entire circumference along the external shape of the annular sealing portion 30A so as to enter into the groove 90 between the adjacent transparent conductive layers 12A to 12F and to spread over the adjacent transparent conductive layers 12. To describe in detail, the insulating material 33 also covers the edge portion of the main body portion 12a forming the first groove 90A as well as enters into the first groove 90A in the part at which the first groove 90A formed along the edge portion of the main body portion 12a of the transparent conductive layer 12 of the groove 90 is formed. On the other hand, in between the main body portion 12a in which the first groove 90A is not formed and the protruding portion 12c as well, the insulating material 33 is formed on the transparent conductive layer 12 and the insulating material 33 is formed over the entire circumference along the external shape of the sealing portion 30A. In addition, the insulating material 33 covers also the edge portion of the transparent conductive layer 12 present on the side opposite to the main body portion 12a via the first groove 90A and is provided to the outer side of the sealing portion 30A. However, in the present embodiment, the groove formed along the edge portion of the part excluding the main body portion 12a of the transparent conductive layer 12 of the first groove 90A and the second groove 90B are not covered with the insulating material 33.

As illustrated in FIG. 6, the width P of the adhesive portion of the surface on the transparent conductive substrate 15 side of the counter electrode 20 with the partitioning portion 31b of the first integrated sealing portion 31 is narrower than the width Q of the adhesive portion of the surface on the transparent conductive substrate 15 side of the counter electrode 20 with the annular portion 31a of the first integrated sealing portion 31. Furthermore, the width R of the partitioning portion 31b of the first integrated sealing portion 31 is 100% or more and less than 200% of the width T of the annular portion 31a of the first integrated sealing portion 31.

In addition, the second integrated sealing portion 32 has a main body portion 32d provided on the side opposite to the working electrode 10 of the counter electrode 20 and an adhesive portion 32e provided between the adjacent counter electrodes 20. The second integrated sealing portion 32 is adhered to the first integrated sealing portion 31 by the adhesive portion 32e.

As illustrated in FIG. 1, the back sheet 80 is provided on the transparent conductive substrate 15. The back sheet 80 includes a laminate 80A including a weather-resistant layer and a metal layer and an adhesive portion 80B which is provided on the side opposite to the metal layer with respect to the laminate 80A and adheres to the transparent conductive substrate 15 via the coupling portion 14. Here, the adhesive portion 80B is provided in order to make the back sheet 80 adhere to the transparent conductive substrate 15, and as illustrated in FIG. 1, the adhesive portion 80B may be formed on the peripheral portion of the laminate 80A. However, the adhesive portion 80B may be provided on the entire surface of the DSC 50 side of the laminate 80A. The peripheral portion 80a of the back sheet 80 is connected with the transparent conductive layers 12D, 12E, and 12F among the transparent conductive layers 12 by the adhesive portion 80B via the coupling portion 14. Here, the adhesive portion 80B is spaced apart from the sealing portion 30A of the DSC 50. Moreover, the coupling portion 14 is also spaced apart from the sealing portion 30A. Furthermore, the second connecting portion 12i of the transparent conductive layer 12E is disposed on the inner side of the annular coupling portion 14. In addition, the transparent conductive layer 12F connects the transparent substrate 11 with the coupling portion 14 and is provided so as to surround the transparent conductive layers 12A to 12D of the DSC 50 and to form a part of the groove 90 between the transparent conductive layers 12A to 12D. Here, the first groove 90A which is a part of the groove 90 is disposed on the inner side of the annular coupling portion 14, and the second groove 90B is disposed on the outer side of the inner periphery of the annular coupling portion 14. Meanwhile, the electrolyte 40 is not filled in the space which is on the inner side than the back sheet 80 and the outer side of the sealing portion 30A.

In addition, in the transparent conductive layer 12D, a current collecting wiring 17 having a lower resistance than the transparent conductive layer 12D extends so as to pass through the main body portion 12a, the connecting portion 12g, and the current extracting portion 12f. This current collecting wiring 17 is disposed so as not to intersect with the coupling portion 14 of the back sheet 80 with the transparent conductive substrate 15. That is to say, the current collecting wiring 17 is disposed on the inner side than the coupling portion 14. In addition, the current collecting wiring 17 is disposed on the transparent conductive layer 12D of the DSC 50D and between the part which is spaced apart from the sealing portion 30A on the outer side of the sealing portion 30A of the first groove 90A and the sealing portion 30A.

Meanwhile, as illustrated in FIG. 2, bypass diodes 70A to 70D are connected in parallel with the DSCs 50A to 50D, respectively. Specifically, the bypass diode 70A is fixed on the partitioning portion 32b of the second integrated sealing portion 32 between the DSC 50A and the DSC 50B, the bypass diode 70B is fixed on the partitioning portion 32b of the second integrated sealing portion 32 between the DSC 50B and the DSC 50C, and the bypass diode 70C is fixed on the partitioning portion 32b of the second integrated sealing portion 32 between the DSC 50C and the DSC 50D. The bypass diode 70D is fixed on the sealing portion 30A of the DSC 50D. In addition, the conductive material 60Q is fixed to the metal substrate 21 of the counter electrode 20 so as to pass through the bypass diodes 70A to 70D. Moreover, the conductive material 60P branches out from the conductive materials 60Q between the bypass diodes 70A and 70B, between the bypass diodes 70B and 70C, and between the bypass diodes 70C and 70D, respectively, and is connected with the conductive material connecting portion 16A on the transparent conductive layer 12A, the conductive material connecting portion 16A on the transparent conductive layer 12B, and the conductive material connecting portion 16A on the transparent conductive layer 12C, respectively. In addition, the conductive material 60P is also fixed to the metal substrate 21 of the counter electrode 20 of the DSC 50A, and this conductive material 60P connects the bypass diode 70A with the conductive material connecting portion 16A of the connecting terminal 16 on the transparent conductive layer 12E. Moreover, the bypass diode 70D is connected with the transparent conductive layer 12D via the conductive material 60P.

In addition, as illustrated in FIG. 1, a desiccant 95 is provided on the counter electrode 20 of each DSC 50.

In the DSC module 100 above, the groove 90 is provided, and the groove 90 has the first groove 90A formed along the external shape of the annular sealing portion 30A. Moreover, the insulating material 33 continuously covers also the edge portion of the main body portion 12a as well as the insulating material 33 enters into the first groove 90A. For this reason, even if a crack is formed inside the transparent substrate 11 and at the position downward the groove 90 along the groove 90 and the crack continues to the edge portion of the main body portion 12a, the penetration of moisture, which has passed through the crack, from the outside of the sealing portion 30A is sufficiently suppressed by the insulating material 33. For this reason, according to the DSC module 100, it is possible to exhibit excellent durability.

In addition, in the DSC module 100, the insulating material 33 is provided over the entire circumference along the external shape of the sealing portion 30A, and thus it is possible to exhibit more excellent durability since the penetration path of moisture from the outside can be blocked over the entire circumference.

Moreover, in the DSC module 100, the first groove 90A is provided along the edge portion of the main body portion 12a. For this reason, it is possible to reduce the region surrounded by the first groove 90A compared to a case in which the first groove 90A is formed on the outer side than the edge portion of the main body portion 12a, and thus it is possible to miniaturize the DSC module 100.

In addition, in the DSC module 100, the insulating coupling portion 14 is provided on the entire circumference of the peripheral portion of the back sheet 80, and thus it is possible to sufficiently suppress the penetration of moisture from the outer side of the back sheet 80 into the inner side of the back sheet 80.

Moreover, in the DSC module 100, the insulating material 33 enters even into the first groove 90A between the transparent conductive layers 12 of the adjacent DSCs 50, and thus it is possible to suppress the flowing of current between the transparent conductive layers 12, and as a result, it is possible to sufficiently secure the insulation properties. For this reason, it is possible to improve the photoelectric conversion characteristics.

In addition, in the DSC module 100, the sealing portion 30A and the insulating material 33 are disposed so as to be superimposed on each other. For this reason, it is possible to further increase the area of the part contributing to the power generation when seen from the light receiving surface side of the DSC module 100 compared to a case in which the sealing portion 30A and the insulating material 33 are disposed so as not to be superimposed on each other. For this reason, it is possible to more improve the aperture ratio.

In addition, in the DSC module 100, the first current extracting portion 12f and the second current extracting portion 12h are disposed in the vicinity of the DSC 50A and on the side opposite to the transparent conductive layer 12B with respect to the transparent conductive layer 12A, and the first current extracting portion 12f of the transparent conductive layer 12A and the second current extracting portion 12h of the transparent conductive layer 12F are disposed so as to be adjacent to each other via the groove 90. For this reason, in the DSC module 100, it is possible to dispose the external connecting terminals 18a and 18b to the first current extracting portion 12f and second current extracting portion 12h, respectively, so as to be adjacent to each other. Hence, it is possible to set the number of connectors for extracting the current from the external connecting terminals 18a and 18b to the outside to one. In other words, the first current extracting portion 12f and the second current extracting portion 12h are disposed to be greatly spaced apart from each other, for example, in a case in which the first current extracting portion 12f is disposed on the side opposite to the transparent conductive layer 12c with respect to the transparent conductive layer 12D, and thus the external connecting terminals 18a and 18b are disposed to be greatly spaced apart from each other as well. In this case, two connectors of a connector to be connected with the external connecting terminal 18a and a connector to be connected with the external connecting terminal 18b are required in order to extract the current from the DSC module 100. However, according to the DSC module 100, it is possible to dispose the external connecting terminals 18a and 18b so as to be adjacent to each other, and thus only one connector is required. For this reason, according to the DSC module 100, it is possible to achieve space saving. In addition, the generated current is low when the DSC module 100 is used under a low illuminance. Specifically, the generated current is 2 mA or lower. For this reason, it is possible to sufficiently suppress the deterioration of the photoelectric conversion performance of the DSC module 100 even if a part of the transparent conductive layer 12D of the DSC 50D on one end side of the DSC 50A and DSC 50D at both ends of the DSCs 50A to 50D is disposed next to the second current extracting portion 12h which is electrically connected with the metal substrate 21 of the counter electrode 20 of the DSC 50A on the other end side via the groove 90 as the first current extracting portion 12f.

In addition, in the DSC module 100, the DSCs 50A to 50D are arranged in a line along the X direction, the transparent conductive layer 12D of the DSC 50D on one end side of the DSC 50A and DSC 50D at both ends of the DSCs 50A to 50D has the main body portion 12a provided on the inner side of the sealing portion 30A, the first current extracting portion 12f, and the connecting portion 12g which connects the main body portion 12a with the first current extracting portion 12f. For this reason, it is possible to more shorten the installation region of the connecting terminal 16 provided along the arrangement direction (X direction in FIG. 2) of the DSCs 50A to 50D in order to connect two adjacent DSCs 50 compared to a case in which the DSCs 50C and 50D of a part of the DSCs 50A to 50D are folded back in the middle and the DSC 50A and the DSC 50D are disposed so as to be adjacent to each other, and thus it is possible to achieve space saving to a greater extent. Furthermore, according to the DSC module 100, the generated current is usually low in a case in which the DSC module 100 is used in a low illuminance environment, and thus it is possible to sufficiently suppress the deterioration of the photoelectric conversion characteristics although the DSC module 100 further has the first connecting portion 12g which connects the main body portion 12a with the first current extracting portion 12f.

Moreover, in the DSC module 100, the current collecting wiring 17 is disposed so as not to intersect with the coupling portion 14 of the transparent conductive substrate 15 with the back sheet 80. It is possible to prevent the water vapor or the like from penetrating from the outside into the space between the back sheet 80 and the transparent conductive substrate 15 through the current collecting wiring 17 when the current collecting wiring 17 is disposed so as not to intersect with the coupling portion 14 of the transparent conductive substrate 15 with the back sheet 80 although the current collecting wiring generally exhibits air permeability since it is porous and thus gas such as water vapor is permeable through it. As a result, it is possible for the DSC module 100 to exhibit excellent durability. Furthermore, it is possible to sufficiently suppress the deterioration of the photoelectric conversion characteristics even if the generated current increases since the current collecting wiring 17 has a lower resistance than the transparent conductive layer 12D.

In addition, in the DSC module 100, the current collecting wiring 17 is disposed on the transparent conductive layer 12D of the DSC 50D and between the part which is spaced apart from the sealing portion 30A on the outer side of the sealing portion 30A of the first groove 90A and the sealing portion 30A. For this reason, it is possible to extract the current generated on the inner side of the sealing portion 30A of the DSC 50 to the outer side of the sealing portion 30A by the current collecting wiring 17. In addition, it is possible to sufficiently suppress that gas such as water vapor or the like penetrates into the inner side of the sealing portion through the current collecting Wiring 17 since the current collecting wiring 17 is disposed between the sealing portion 30A and the first groove 90A on the outer side of the sealing portion 30A although the current collecting wiring 17 generally exhibits air permeability since it is porous and thus gas such as water vapor or the like is permeable through it. For this reason, more excellent durability is obtained.

Furthermore, the connecting terminal 16 is likely to peel off from the protruding portion 12c of the transparent conductive layer 12 as the width of the connecting terminal 16 is narrower in a case in which the DSC module 100 is placed in an environment in which the temperature change is great. With regard to that point, in the DSC module 100, the conductive material non-connecting portion 16B of the connecting terminal 16 has a narrower width than the conductive material connecting portion 16A connected with the conductive material 60P. For this reason, the conductive material non-connecting portion 16B of the connecting terminals 16 is less likely to peel off from the protruding portion 12c of the transparent conductive layer 12. Hence, the conductive material non-connecting portion 16B does not peel off from the transparent conductive layer 12 and thus it is possible to maintain the connection with the transparent conductive layer 12 even if the conductive material connecting portion 16A peels off from the protruding portion 12c of the transparent conductive layer 12. Furthermore, it is possible to normally operate the DSC module 100 even if the conductive material connecting portion 16A peels off from the protruding portion 12c of the transparent conductive layer 12. Consequently, according to the DSC module 100, it is possible to improve the connection reliability. In addition, the conductive material 60P connected with the metal substrate 21 of the counter electrode 20 of one DSC 50 of two adjacent DSCs 50 is connected with the conductive material connecting portion 16A on the protruding portion 12c of the other DSC 50, and the conductive material connecting portion 16A is provided on the protruding portion 12c and the outer side of the sealing portion 30A. In other words, the connection of two adjacent DSCs 50 is performed on the outer side of the sealing portion 30A. For this reason, according to the DSC module 100, it is possible to improve the aperture ratio.

In addition, in the DSC module 100, in the DSC 50 that is connected with the adjacent DSC 50 among the DSCs 50A to 50D, the protruding portion 12c has the projecting portion 12d which laterally projects from the main body portion 12a and the facing portion 12e which extends from the projecting portion 12d and faces the main body portion 12a of the adjacent DSC 50, and at least the conductive material connecting portion 16A of the connecting terminal 16 is provided on the facing portion 12e.

In this case, at least the conductive material connecting portion 16A of the connecting terminal 16 is provided on the facing portion 12e facing the main body portion 12a of the adjacent DSC 50, and thus it is possible to sufficiently prevent the conductive material 60P connected with the conductive material connecting portion 16A from passing over the metal substrate 21 of the counter electrode 20 of the adjacent DSC 50 unlike the case in which at least the conductive material connecting portion 16A of the connecting terminal 16 is not provided on the facing portion 12e facing the main body portion 12a of the adjacent DSC 50. As a result, it is possible to sufficiently prevent the short circuit between the adjacent DSCs 50.

In addition, in the DSC module 100, both of the conductive material connecting portion 16A and the conductive material non-connecting portion 16B are disposed along the sealing portion 30A. For this reason, it is possible to save the space required for the connecting terminal 16 compared to the case of disposing the conductive material connecting portion 16A and the conductive material non-connecting portion 16B in the direction away from the sealing portion 30A.

Furthermore, in the DSC module 100, the adhesive portion 80B of the back sheet 80 is spaced apart from the sealing portion 30A of the DSC 50. For this reason, it is sufficiently suppressed that the sealing portion 30A is stretched since the adhesive portion 80B is constricted at a low temperature and thus an excessive stress is applied to the interface between the sealing portion 30A and the transparent conductive substrate 15 or the counter electrode 20. In addition, at a high temperature as well, it is sufficiently suppressed that the sealing portion 30A is pressed since the adhesive portion 80B expands and thus an excessive stress is applied to the interface between the sealing portion 30A and the transparent conductive substrate 15 or the counter electrode 20. In other words, it is sufficiently suppressed that an excessive stress is applied to the interface between the sealing portion 30A and the transparent conductive substrate 15 or the counter electrode 20 both at a high temperature and a low temperature. For this reason, it is possible for the DSC module 100 to exhibit excellent durability.

Furthermore, in the DSC module 100, the width P of the adhesive portion of the surface on the transparent conductive substrate 15 side of the counter electrode 20 with the partitioning portion 31b of the first integrated sealing portion 31 is narrower than the width Q of the adhesive portion of the surface on the transparent conductive substrate 15 side of the counter electrode 20 with the annular portion 31a of the first integrated sealing portion 31. For this reason, it is possible to more sufficiently improve the aperture ratio of the DSC module 100. In addition, in the DSC module 100, the adjacent first sealing portions 31A are integrated between the adjacent counter electrodes 20 and the adjacent second sealing portions 32A are integrated between the adjacent counter electrodes 20. Here, the sealing portion exposed to the atmosphere is in two places in between the adjacent DSCs 50 when the adjacent first sealing portions 31A are not integrated. In contrast to this, in the DSC module 100, the sealing portion exposed to the atmosphere is in one place in between the adjacent DSCs 50 since the adjacent first sealing portions 31A are integrated. In other words, the sealing portion exposed to the atmosphere is in only one place of the partitioning portion 31b in between the adjacent DSCs 50 since the first integrated sealing portion 31 is constituted by the annular portion 31a and the partitioning portion 31b. In addition, the penetration distance of moisture or the like from the atmosphere to the electrolyte 40 increases since the first sealing portions 31A are integrated. For this reason, it is possible to sufficiently reduce the amount of moisture or air penetrating from the outside of the DSC 50 in between the adjacent DSCs 50. In other words, it is possible to sufficiently improve the sealing ability of the DSC module 100. In addition, according to the DSC module 100, the adjacent first sealing portions 31A are integrated. For this reason, it is possible to secure a sufficient sealing width at the partitioning portion 31b even if the width P of the adhesive portion of the surface on the transparent conductive substrate 15 side of the counter electrode 20 with the partitioning portion 31b of the first integrated sealing portion 31 is narrower than the width Q of the adhesive portion of the surface on the transparent conductive substrate 15 side of the counter electrode 20 with the annular portion 31a of the first integrated sealing portion 31. In other words, according to the DSC module 100, it is possible to sufficiently increase the bonding strength of the first sealing portion 31A with the transparent conductive substrate 15 and the bonding strength of the first sealing portion 31A with the counter electrode 20 while improving the aperture ratio. As a result, it is possible to improve the aperture ratio as well as it is possible to sufficiently suppress the peeling of the first sealing portion 31A from the transparent conductive substrate 15 and the counter electrode 20 even if the electrolyte 40 expands and thus an excessive stress directed from the inner side to the outer side of the first sealing portion 31A is applied in the case of using the DSC module 100 under a high temperature and thus it is possible to exhibit excellent durability.

Furthermore, in the DSC module 100, the width R of the counter electrode 20 with the partitioning portion 31b of the first integrated sealing portion 31 is 100% or more and less than 200% of the width T of the annular portion 31a of the first integrated sealing portion 31. In this case, the width of the partitioning portion 31b is 100% or more of the width T of the annular portion 31a in the partitioning portion 31b of the first integrated sealing portion 31, and thus the penetration distance of moisture or the like from the atmosphere to the electrolyte 40 increases compared to a case in which the width R of the partitioning portion 31b is less than 100% of the width T of the annular portion 31a in the partitioning portion 31b of the first integrated sealing portion 31. For this reason, it is possible to more sufficiently suppress that the moisture penetrates from the outside through the partitioning portion 31b present between the adjacent DSCs 50. On the other hand, it is possible to more improve the aperture ratio compared to a case in which the width R of the partitioning portion 31b exceeds 200% of the width T of the annular portion 31a.

In addition, in the DSC module 100, the second sealing portion 32A is adhered to the first sealing portion 31A, and the edge portion 20a of the counter electrode 20 is sandwiched by the first sealing portion 31A and the second sealing portion 32A. For this reason, the peeling is sufficiently suppressed by the second sealing portion 32A even if the stress in the direction away from the working electrode 10 with respect to the counter electrode 20 is applied. In addition, the partitioning portion 32b of the second integrated sealing portion 32 is adhered to the first sealing portion 31A through the gap S between the adjacent counter electrodes 20 and thus it is reliably prevented that the counter electrodes 20 of the adjacent DSCs 50 come in contact with each other.

Next, the working electrode 10, the coupling portion 14, the photosensitizing dye, the counter electrode 20, the sealing portion 30A, the electrolyte 40, the conductive materials 60P and 60Q, the back sheet 80, and the desiccant 95 will be described in detail.

(Working Electrode)

The material constituting the transparent substrate 11 may be any transparent material, for example, and examples of such a transparent material may include glass such as borosilicate glass, soda lime glass, glass which is made of soda lime and whose iron component is less than that of ordinary soda lime glass, and quartz glass, polyethylene terephthalate (PET), polyethylene naphthalate (PEN), polycarbonate (PC), and polyethersulfone (PES). The thickness of the transparent substrate 11 is appropriately determined depending on the size of the DSC module 100 and is not particularly limited, but it may be set into the range of from 50 to 10000 µm, for example.

Examples of the material contained in the transparent conductive layer 12 may include a conductive metal oxide such as indium-tin-oxide (ITO), tin oxide ($SnO_2$), and fluorine-doped-tin-oxide (FTO). The transparent conductive layer 12 may be constituted by a single layer or a laminate consisting of a plurality of layers containing different conductive metal oxides. It is preferable that the transparent conductive layer 12 contain FTO since FTO exhibits high heat resistance and chemical resistance in a case in which the transparent conductive layer 12 is constituted by a single layer. The transparent conductive layer 12 may further contain a glass frit. The thickness of the transparent conductive layer 12 may be set into the range of from 0.01 to 2 µm, for example.

In addition, the resistance value of the connecting portion 12g of the transparent conductive layer 12D of the transparent conductive layer 12 is not particularly limited but is preferably equal to or less than the resistance value represented by the following Equation (1).

$$\text{Resistance value} = \text{number of DSC 50 connected in series} \times 120\Omega \quad (1)$$

In this case, it is possible to sufficiently suppress the deterioration of the performance of the DSC module 100 compared to a case in which the resistance value of the connecting portion 12g exceeds the resistance value represented by Equation (1) above. In the present embodiment, the number of DSCs 50 is 4 and thus the resistance value represented by Equation (1) above becomes 480Ω, and consequently, the resistance value of the connecting portion 12g is preferably 480Ω or less.

It is possible to use an inorganic material such as a glass frit or a resin as the insulating material 33. Among them, the insulating material 33 is preferably a glass frit. It is possible to effectively suppress the penetration of moisture or the like from the first groove 90A since a glass frit exhibits higher sealing ability than a resin material. The thickness of the insulating material 33 is usually from 10 to 30 µm and preferably from 15 to 25 µm. In addition, the width that the insulating material 33 covers the edge portion of the transparent conductive layer 12 is preferably 0.2 mm or more and more preferably 0.5 mm or more. It is possible to sufficiently secure the insulation properties between the transparent conductive layers 12 of the adjacent DSCs 50 by setting the width covering the edge portion of the transparent conductive layer 12 to 0.2 mm or more.

The connecting terminal 16 contains a metallic material. Examples of the metallic material may include silver, copper and indium. These may be used singly or in combination of two or more kinds thereof.

In addition, the connecting terminal 16 may be constituted by the same material as or a different material from the conductive material 60P but it is preferable to be constituted by the same material.

In this case, it is possible to more sufficiently improve the adhesive property of the connecting terminal 16 with the conductive material 60P since the connecting terminal 16 and the conductive material 60P are constituted by the same material. For this reason, it is possible to more improve the connection reliability of the DSC module 100.

In the connecting terminal 16, the width of the conductive material non-connecting portion 16B is not particularly limited as long as it is narrower than the width of the conductive material connecting portion 16A, but it is preferable to be equal to or less than ½ of the width of the conductive material connecting portion 16A.

In this case, it is possible to more improve the connection reliability of the DSC module 100 compared to a case in which the width of the conductive material non-connecting portion 16B exceeds ½ of the width of the conductive material connecting portion 16A.

The width of the conductive material connecting portion 16A is not particularly limited but is preferably from 0.5 to 5 mm and more preferably from 0.8 to 2 mm.

The oxide semiconductor layer 13 is constituted by oxide semiconductor particles. The oxide semiconductor particles are constituted by, for example, titanium oxide ($TiO_2$), silicon oxide ($SiO_2$), zinc oxide (ZnO), tungsten oxide ($WO_3$), niobium oxide ($Nb_2O_5$), strontium titanate ($SrTiO_3$), tin oxide ($SnO_2$), indium oxide ($In_3O_3$), zirconium oxide ($ZrO_2$), thallium oxide ($Ta_2O_5$), lanthanum oxide ($La_2O_3$), yttrium oxide ($Y_2O_3$), holmium oxide ($Ho_2O_3$), bismuth oxide ($Bi_2O_3$), cerium oxide ($CeO_2$), aluminum oxide ($Al_2O_3$), or two or more kinds of these.

The oxide semiconductor layer 13 is usually constituted by an absorbing layer for absorbing light, but may be constituted by an absorbing layer and a reflective layer to return the light that is transmitted through the absorbing layer to the absorbing layer by reflecting the light.

The thickness of the oxide semiconductor layer 13 may be set to from 0.5 to 50 μm, for example.

(Coupling Portion)

The material constituting the coupling portion 14 is not particularly limited as long as it can make the back sheet 80 adhere to the transparent conductive layer 12, and it is possible to use, for example, a glass frit, a resin material which is the same as the resin material used for the sealing portion 31A, or the like as the material constituting the coupling portion 14. Among them, the coupling portion 14 is preferably a glass frit. It is possible to effectively suppress the penetration of moisture or the like from the outside of the back sheet 80 since the glass frit exhibits higher sealing ability than the resin material.

(Photosensitizing Dye)

Examples of the photosensitizing dye may include a ruthenium complex having a ligand containing a bipyridine structure, terpyridine structure or the like, or an organic dye such as porphyrin, eosin, rhodamine, or merocyanine.

(Counter Electrode)

As described above, the counter electrode 20 is equipped with a metal substrate 21 and a conductive catalyst layer 22 which is provided on the working electrode 10 side of the metal substrate 21 and promotes the reduction reaction on the surface of the counter electrode 20.

The metal substrate 21 is constituted by, for example, a corrosion-resistant metallic material such as titanium, nickel, platinum, molybdenum, tungsten, aluminum, or stainless steel. The thickness of the metal substrate 21 is appropriately determined depending on the size of the DSC module 100 and is not particularly limited, but it may be set to from 0.005 to 0.1 mm, for example.

The catalyst layer 22 is constituted by platinum, a carbon-based material, or a conductive polymer. Here, a carbon nanotube is suitably used as the carbon-based material.

(Sealing Portion)

The sealing portion 30A is constituted by the first sealing portion 31A and the second sealing portion 32A.

Examples of the material constituting the first sealing portion 31A may include a resin such as a modified polyolefin resin including an ionomer, an ethylene-vinyl acetic anhydride copolymer, an ethylene-methacrylic acid copolymer, an ethylene-vinyl alcohol copolymer and the like, an ultraviolet-cured resin, and vinyl alcohol polymer.

The thickness of the first sealing portion 31A is usually from 40 to 90 μm and preferably from 60 to 80 μm.

The width P of the adhesive portion of the counter electrode 20 with the partitioning portion 31b is 25% or more and less than 100% of the width Q of the adhesive portion of the counter electrode 20 with the annular portion 31a of the first integrated sealing portion 31. In this case, it is possible to exhibit more excellent durability compared to a case in which the width P of the adhesive portion is less than 25% of the width Q of the adhesive portion. The width P of the adhesive portion is more preferably 30% or more and even more preferably 40% or more of the width Q of the adhesive portion.

In the DSC module 100, the width R of the partitioning portion 31b of the first integrated sealing portion 31 is preferably 100% or more and less than 200% and more preferably from 120 to 180% of the width T of the annular portion 31a of the first integrated sealing portion 31.

In this case, it is possible to balance a great aperture ratio with excellent durability.

Examples of the material constituting the second sealing portion 32A may include a resin such as a modified polyolefin resin including an ionomer, an ethylene-vinyl acetic anhydride copolymer, an ethylene-methacrylic acid copolymer, an ethylene-vinyl alcohol copolymer and the like, an ultraviolet-cured resin, and vinyl alcohol polymer in the same manner as the first sealing portion 31A.

The thickness of the second sealing portion 32A is usually from 20 to 45 μm and preferably from 30 to 40 μm.

(Electrolyte)

The electrolyte 40 contains, for example, a redox couple such as $I^-/I_3^-$ and an organic solvent. It is possible to use acetonitrile, methoxy acetonitrile, methoxy propionitrile, propionitrile, ethylene carbonate, propylene carbonate, diethyl carbonate, γ-butyrolactone, valeronitrile, pivalonitrile, glutaronitrile, methacrylonitrile, isobutyronitrile, phenyl acetonitrile, acrylonitrile, succinonitrile, oxalonitrile, pentanenitrile, and adiponitrile as the organic solvent. Examples of the redox couple may include a redox couple such as bromine/bromide ion, a zinc complex, an iron complex, and a cobalt complex in addition to $I^-/I_3^-$. In addition, the electrolyte 40 may use an ionic liquid instead of the organic solvent. As the ionic liquid, it is possible to use, for example, an ordinary temperature molten salt which is a known iodine salt, such as a pyridinium salt, an imidazolium salt, and a triazolium salt, and which is in a molten state at around room temperature. As such an ordinary temperature molten salt, it is possible to suitably use, for example, 1-hexyl-3-methylimidazolium iodide, 1-ethyl-3-propylimidazolium iodide, dimethylimidazolium iodide, ethylmethylimidazolium iodide, dimethylpropylimidazolium iodide, butylmethylimidazolium iodide, or methylpropylimidazolium iodide.

In addition, the electrolyte 40 may use a mixture of the ionic liquid above with the organic solvent above instead of the organic solvent above.

In addition, it is possible to add an additive to the electrolyte 40. Examples of the additive may include LiI, $I_2$, 4-t-butylpyridine, guanidinium thiocyanate, 1-methylbenzimidazole, and 1-butylbenzimidazole.

Moreover, as the electrolyte 40, a nanocomposite gel electrolyte which is a quasi-solid electrolyte obtained by kneading nanoparticles such as $SiO_2$, $TiO_2$, and carbon nanotubes with the electrolyte above into a gel-like form may be used, or an electrolyte gelled using an organic gelling agent such as polyvinylidene fluoride, a polyethylene oxide derivative, and an amino acid derivative may also be used.

Meanwhile, the electrolyte 40 contains a redox couple consisting of $I^-/I_3^-$, and the concentration of $I_3^-$ is preferably 0.006 mol/L or less, more preferably from 0 to $6 \times 10^{-6}$ mol/L, and even more preferably from 0 to $6 \times 10^{-8}$ mol/L. In this case, it is possible to more reduce the leakage current since the concentration of $I_3^-$ which carries electrons is low. For this reason, it is possible to more increase the open circuit voltage, and thus it is possible to more improve the photoelectric conversion characteristics.

(Conductive Material)

As the conductive materials 60P and 60Q, for example, a metal film is used. It is possible to use, for example, silver or copper as the metallic material constituting the metal film.

(Back Sheet)

As described above, the back sheet 80 includes the laminate 80A including a weather resistant layer and a metal layer and the adhesive portion 80B which is provided on the surface of the DSC 50 side of the laminate 80A and adheres the laminate 80A to the coupling portion 14.

The weather resistant layer may be constituted by, for example, polyethylene terephthalate or polybutylene terephthalate.

The thickness of the weather resistant layer may be from 50 to 300 μm, for example.

The metal layer may be constituted by, for example, a metallic material containing aluminum. The metallic material is usually constituted by aluminum simple substance but may be an alloy of aluminum with other metals. Examples of the other metals may include copper, manganese, zinc, magnesium, lead, and bismuth. Specifically, a 1000 series aluminum is desirable in which other metals are added to aluminum of 98% or higher purity in a trace quantity. This is because this 1000 series aluminum is inexpensive and excellent in workability compared to other aluminum alloys.

The thickness of the metal layer is not particularly limited but may be from 12 to 30 μm, for example.

The laminate 80A may further include a resin layer. Examples of the material constituting the resin layer may include a butyl rubber, a nitrile rubber, and a thermoplastic resin. These can be used singly or in combination of two or more kinds thereof. The resin layer may be formed on the entire surface on the side opposite to the weather resistant layer of the metal layer or may be formed only on the peripheral portion thereof.

Examples of the material constituting the adhesive portion 80B may include a butyl rubber, a nitrile rubber, and a thermoplastic resin. These can be used singly or in combination of two or more kinds thereof. The thickness of the adhesive portion 80B is not particularly limited but may be from 300 to 1000 μm, for example.

(Desiccant)

The desiccant 95 may be in a sheet shape or granular. The desiccant 95 may be one which absorbs moisture, for example, and examples of the desiccant 95 may include silica gel, alumina, and zeolite.

Figure 7:
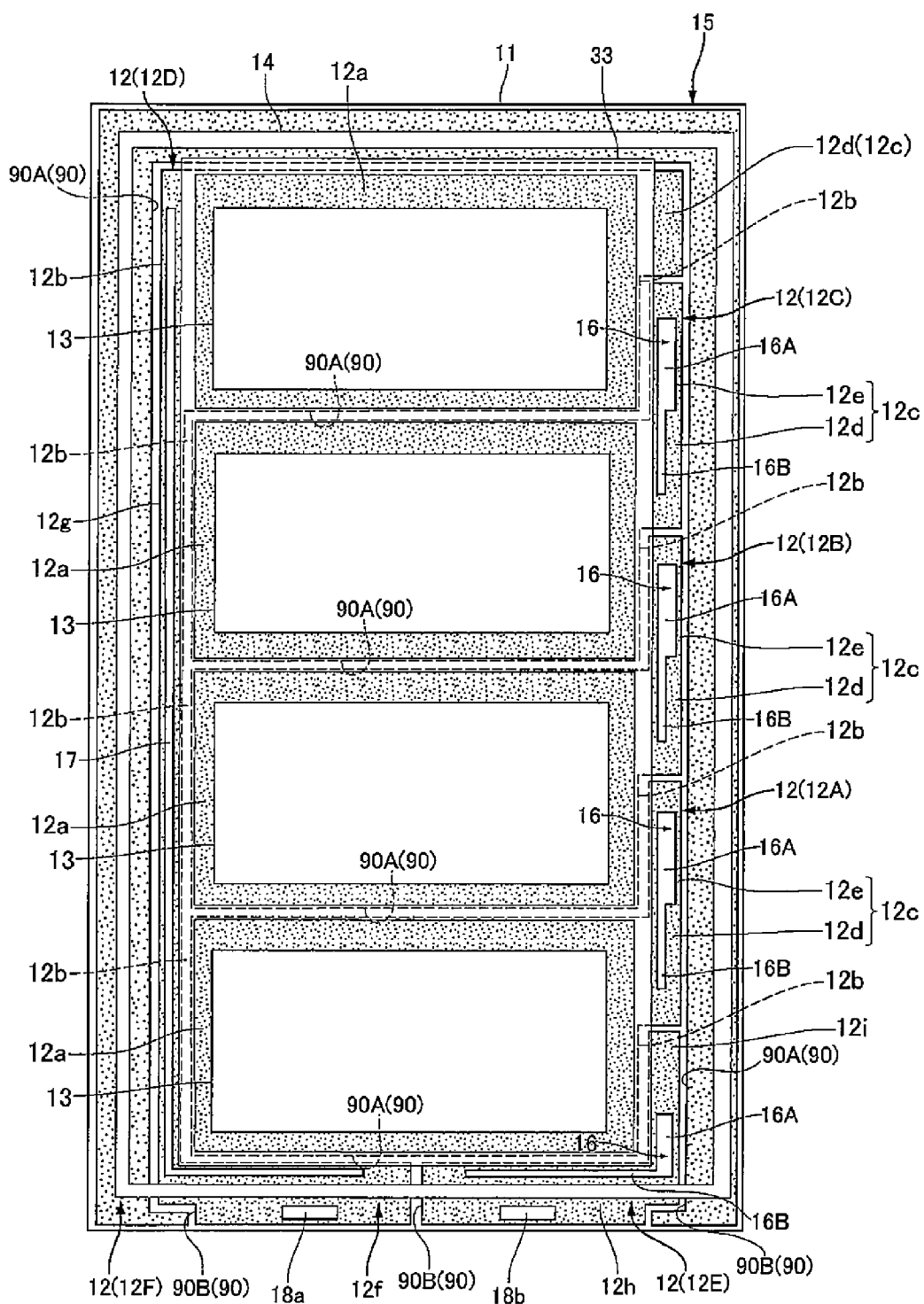
FIG. 7 is a plan view illustrating a working electrode having a coupling portion formed for fixing a back sheet.
Figure 8:
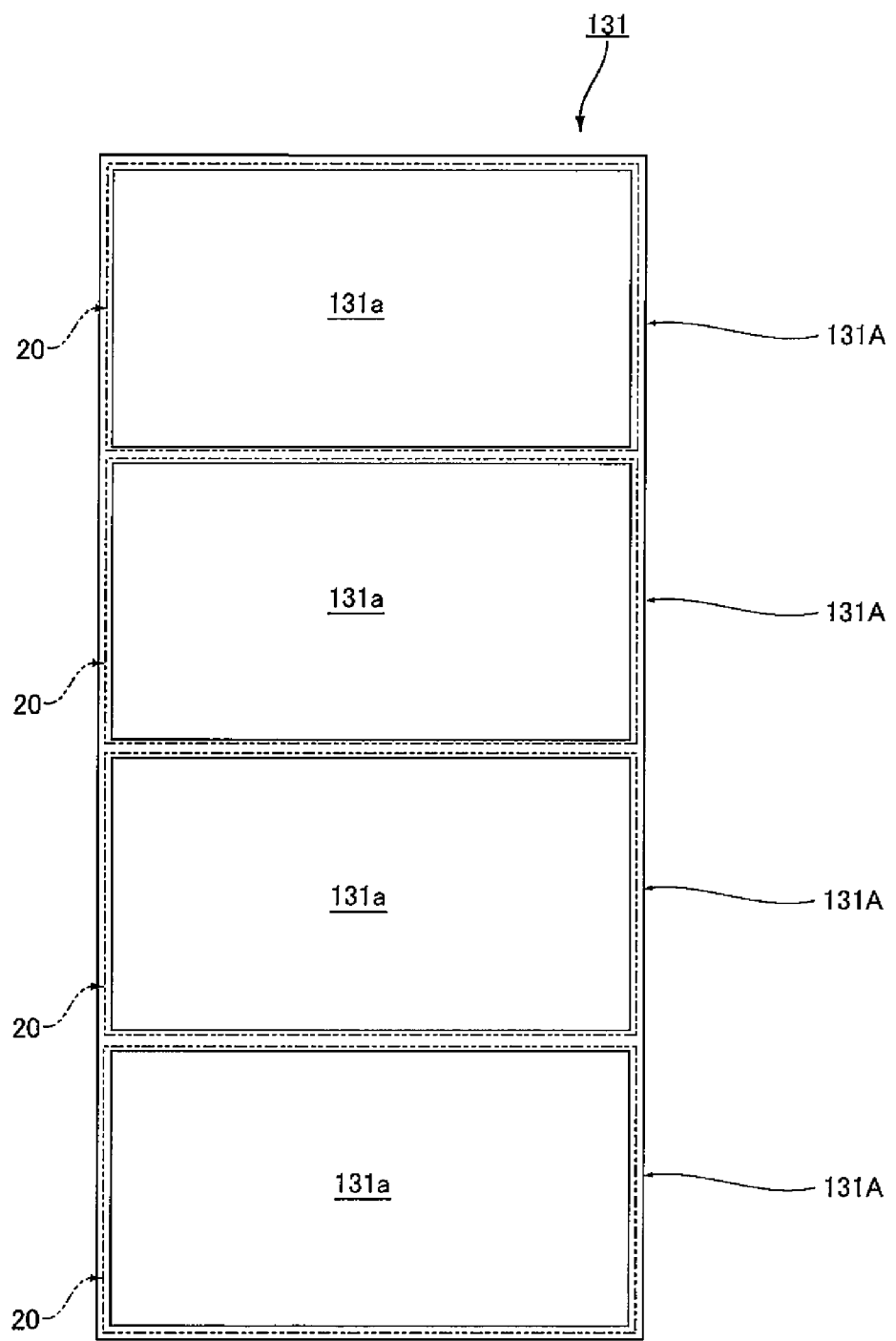
FIG. 8 is a plan view illustrating a first integrated sealing portion forming body for forming a first integrated sealing portion of FIG. 4.

Next, the method of manufacturing the DSC module 100 will be described with reference to FIG. 3, FIG. 7 and FIG. 8. FIG. 7 is a plan view illustrating a working electrode having a coupling portion formed for fixing a back sheet and FIG. 8 is a plan view illustrating a first integrated sealing portion forming body for forming a first integrated sealing portion of FIG. 4.

First, a laminate obtained by forming a transparent conductive layer on one transparent substrate 11 is prepared.

As the method of forming the transparent conductive layer, a sputtering method, a vapor deposition method, a spray pyrolysis deposition method (SPD), or a CVD method is used.

Next, as illustrated in FIG. 3, the groove 90 is formed with respect to the transparent conductive layer, and the transparent conductive layers 12A to 12F which are disposed in an insulated state to interpose the groove 90 between one another are formed. Specifically, the four transparent conductive layers 12A to 12D corresponding to the DSCs 50A to 50D are formed so as to have the quadrangular-shaped main body portion 12a and the protruding portion 12c. At this time, the transparent conductive layers 12A to 12C corresponding to the DSCs 50A to 50C are formed such that the protruding portion 12c has not only the projecting portion 12d but also the facing portion 12e which extends from the projecting portion 12d and faces the main body portion 12a of the adjacent DSC 50. In addition, the transparent conductive layer 12D is formed so as to have not only the quadrangular-shaped main body portion 12a and the projecting portion 12d but also the first current extracting portion 12f and the connecting portion 12g connecting the first current extracting portion 12f and the main body portion 12a. At this time, the first current extracting portion 12f is formed so as to be disposed on the side opposite to the transparent conductive layer 12B with respect to the transparent conductive layer 12A. Moreover, the transparent conductive layer 12E is formed so as to form the second current extracting portion 12h. At this time, the second current extracting portion 12h is formed so as to be disposed on the side opposite to the transparent conductive layer 12B with respect to the transparent conductive layer 12A and to be disposed next to the first current extracting portion 12f via the groove 90.

It is possible to form the groove 90 by, for example, a laser scribing method using a YAG laser, a $CO_2$ laser or the like as the light source.

In this manner, the transparent conductive substrate 15 obtained by forming a transparent conductive layer 12 on the transparent substrate 11 is obtained.

Next, a precursor of the connecting terminal 16 constituted by the conductive material connecting portion 16A and the conductive material non-connecting portion 16B is formed on the protruding portion 12c of the transparent conductive layers 12A to 12C. Specifically, the precursor of the connecting terminal 16 is formed such that the conductive material connecting portion 16A is provided on the facing portion 12e. In addition, the precursor of the connecting terminal 16 is also formed on the transparent conductive layer 12E. In addition, the precursor of conductive material non-connecting portion 16B is formed so as to be narrower than the width of the conductive material connecting portion 16A. The precursor of the connecting terminal 16 can be formed, for example, by coating and drying a silver paste.

Moreover, a precursor of the current collecting wiring 17 is formed on the connecting portion 12g of the transparent conductive layer 12D. The precursor of the current collecting wiring 17 can be formed, for example, by coating and drying a silver paste.

In addition, precursors of the external connecting terminals 18a and 18b for extracting the current to the outside are respectively formed on the first current extracting portion 12f and the second current extracting portion 12h of the transparent conductive layer 12A. The precursor of the external connecting terminal can be formed, for example, by coating and drying a silver paste.

Furthermore, a precursor of the insulating material 33 is formed so as to enter into the first groove 90A formed along the edge portion of the main body portion 12a among the first grooves 90A and to cover the edge portion of the main body portion 12a as well. The insulating material 33 can be formed, for example, by coating and drying a paste containing a glass frit.

In addition, in order to fix the back sheet 80, in the same manner as the insulating material 33, a precursor of the annular coupling portion 14 is formed so as to surround the insulating material 33 and to pass through the transparent conductive layer 12D, the transparent conductive layer 12E, and the transparent conductive layer 12F.

Furthermore, a precursor of the oxide semiconductor layer 13 is formed on the main body portion 12a of each of the transparent conductive layers 12A to 12D. The precursor of the oxide semiconductor layer 13 can be formed by printing and then drying a paste for porous oxide semiconductor layer formation containing oxide semiconductor particles.

The paste for oxide semiconductor layer formation contains a resin such as polyethylene glycol and a solvent such as terpineol in addition to the oxide semiconductor particles.

It is possible to use, for example, a screen printing method, a doctor blading method, or a bar coating method as the printing method of the paste for oxide semiconductor layer formation.

Thereafter, the precursor of the connecting terminal 16, the precursor of the insulating material 33, the precursor of the coupling portion 14, and the precursor of the oxide semiconductor layer 13 are collectively fired to form the connecting terminal 16, the insulating material 33, the coupling portion 14, and the oxide semiconductor layer 13.

At this time, the firing temperature varies depending on the kind of the oxide semiconductor particles or the glass frit but is usually from 350 to 600° C., and the firing time also varies depending on the kind of the oxide semiconductor particles or the glass frit but is usually from 1 to 5 hours.

In this manner, as illustrated in FIG. 7, the working electrode 10 is obtained in which the coupling portion 14 for fixing the back sheet 80 is formed.

Next, the photosensitizing dye is supported on the oxide semiconductor layer 13 of the working electrode 10. For this, the photosensitizing dye may be adsorbed on the oxide semiconductor layer 13 by immersing the working electrode 10 in a solution containing the photosensitizing dye, the extra photosensitizing dye is then washed out with the solvent component of the above solution, and drying is performed, thereby the photosensitizing dye may be adsorbed on the oxide semiconductor layer 13. However, it is also possible to support the photosensitizing dye on the oxide semiconductor layer 13 by coating a solution containing the photosensitizer dye on the oxide semiconductor layer 13 and then drying to adsorb the photosensitizing dye on the oxide semiconductor layer 13.

Next, the electrolyte 40 is disposed on the oxide semiconductor layer 13.

Next, as illustrated in FIG. 8, a first integrated sealing portion forming body 131 for forming the first integrated sealing portion 31 is prepared. The first integrated sealing portion forming body 131 can be obtained by preparing one sheet of resin film for sealing composed of the material constituting the first integrated sealing portion 31 and forming a quadrangular-shaped opening 131a in the resin film for sealing as many as the number of the DSCs 50. The first integrated sealing portion forming body 131 has a structure formed by integrating a plurality of first sealing portion forming bodies 131A.

Thereafter, this first integrated sealing portion forming body 131 is adhered on the working electrode 10. At this time, the first integrated sealing portion forming body 131 is adhered to the working electrode 10 so as to be superimposed on the insulating material 33. The adhesion of the first integrated sealing portion forming body 131 to the working electrode 10 can be performed by heating the first integrated sealing portion forming body 131 to melt. In addition, the first integrated sealing portion forming body 131 is adhered to the working electrode 10 such that the main body portion 12a of the transparent conductive layer 12 is disposed on the inner side of the first integrated sealing portion forming body 131.

Meanwhile, the counter electrodes 20 are prepared to have the same number as the number of the DSCs 50.

The counter electrode 20 can be obtained by forming the conductive catalyst layer 22 which promotes the reduction reaction on the surface of the counter electrode 20 on the metal substrate 21.

Next, one more piece of the first integrated sealing portion forming body 131 described above is prepared. Thereafter, each of the plural counter electrodes 20 is bonded so as to close each of the openings 131a of the first integrated sealing portion forming body 131.

Next, the first integrated sealing portion forming body 131 adhered to the counter electrode 20 and the first integrated sealing portion forming body 131 adhered to the working electrode 10 are superimposed and melted by heating while applying a pressure to the first integrated sealing portion forming body 131. In this manner, the first integrated sealing portion 31 is formed between the working electrode 10 and the counter electrode 20. At this time, the first integrated sealing portion 31 is formed such that the width P of the adhesive portion of the surface on the transparent conductive substrate 15 side of the counter electrode 20 with the partitioning portion 31b of the first integrated sealing portion 31 is narrower than the width Q of the adhesive portion of the surface on the transparent conductive substrate 15 side of the counter electrode 20 with the annular portion 31a of the first integrated sealing portion 31. In addition, the first integrated sealing portion 31 is formed such that the width R of the partitioning portion 31b of the first integrated sealing portion 31 is 100% or more and less than 200% of the width T of the annular portion 31*a* of the first integrated sealing portion 31. The formation of the first integrated sealing portion 31 may be performed under the atmospheric pressure or reduced pressure, but it is preferable to be performed under reduced pressure.

Next, the second integrated sealing portion 32 is prepared (see FIG. 5). The second integrated sealing portion 32 has a structure formed by integrating a plurality of the first sealing portions 32A. The second integrated sealing portion 32 can be obtained by preparing one sheet of resin film for sealing and forming a quadrangular-shaped opening 32*c* in the resin film for sealing as many as the number of the DSCs 50. The second integrated sealing portion 32 is bonded to the counter electrode 20 so as to sandwich the edge portion 20*a* of the counter electrode 20 together with the first integrated sealing portion 31. The adhesion of the second integrated sealing portion 32 to the counter electrode 20 can be performed by heating the second integrated sealing portion 32 to melt.

Examples of the resin film for sealing may include a resin such as a modified polyolefin resin including an ionomer, an ethylene-vinyl acetic anhydride copolymer, an ethylene-methacrylic acid copolymer, an ethylene-vinyl alcohol copolymer and the like, an ultraviolet-cured resin, and vinyl alcohol polymer. It is preferable that the constituent material of the resin film for sealing to form the second integrated sealing portion 32 have a higher melting point than the constituent material of the resin film for sealing to form the first integrated sealing portion 31. In this case, the second sealing portion 32A is harder than the first sealing portion 31A, and thus it is possible to effectively prevent the contact between the counter electrodes 20 of the adjacent DSCs 50. In addition, the first sealing portion 31A is softer than the second sealing portion 32A, and thus it is possible to effectively alleviate the stress applied to the sealing portion 30A.

Next, the bypass diodes 70A, 70B, and 70C are fixed to the partitioning portion 32*b* of the second sealing portion 32. In addition, the bypass diode 70D is fixed on the sealing portion 30A of the DSC 50D as well.

Thereafter, the conductive material 60Q is fixed to the metal substrate 21 of the counter electrode 20 of the DSCs 50B and 50C so as to pass through the bypass diodes 70A to 70D. Moreover, the conductive material 60P is formed such that each of the conductive materials 60Q between the bypass diodes 70A and 70B, between the bypass diodes 70B and 70C, and between the bypass diodes 70C and 70D is connected with the conductive material connecting portion 16A on the transparent conductive layer 12A, the conductive material connecting portion 16A on the transparent conductive layer 12B, and the conductive material connecting portion 16A on the transparent conductive layer 12C, respectively. In addition, the conductive material 60P is fixed to the metal substrate 21 of the counter electrode 20 of the DSC 50A so as to connect the conductive material connecting portion 16A on the transparent conductive layer 12E and the bypass diode 70A. Moreover, the transparent conductive layer 120 is connected with the bypass diode 70A by the conductive material 60P.

At this time, with regard to the conductive material 60P, a paste containing a metallic material constituting the conductive material 60P is prepared, and this paste is coated from the counter electrode 20 over the conductive material connecting portion 16A of the connecting terminal 16 of the adjacent DSC 50 and cured. With regard to the conductive material 60Q, a paste containing a metallic material constituting the conductive material 60Q is prepared, and this paste is coated on each of the counter electrodes 20 so as to link the adjacent bypass diodes and cured. At this time, as the paste above, it is preferable to use a low-temperature curing type paste which is capable of being cured at a temperature of 90° C. or less from the viewpoint of avoiding an adverse effect on the photosensitizing dye.

Finally, the back sheet 80 is prepared, and the peripheral portion 80*a* of the back sheet 80 is adhered to the coupling portion 14. At this time, the back sheet 80 is disposed such that the adhesive portion 80B of the back sheet 80 is spaced apart from the sealing portion 30A of the DSC 50.

The DSC module 100 is obtained in the manner described above.

Meanwhile, in the description above, a method to collectively fire the precursor of the connecting terminal 16, the precursor of the insulating material 33, the precursor of the coupling portion 14, and the precursor of the oxide semiconductor layer 13 is used in order to form the connecting terminal 16, the insulating material 33, the coupling portion 14, and the oxide semiconductor layer 13, but the connecting terminal 16, the insulating material 33, the coupling portion 14, and the oxide semiconductor layer 13 may be formed by separately firing each of the precursors.

Figure 9:
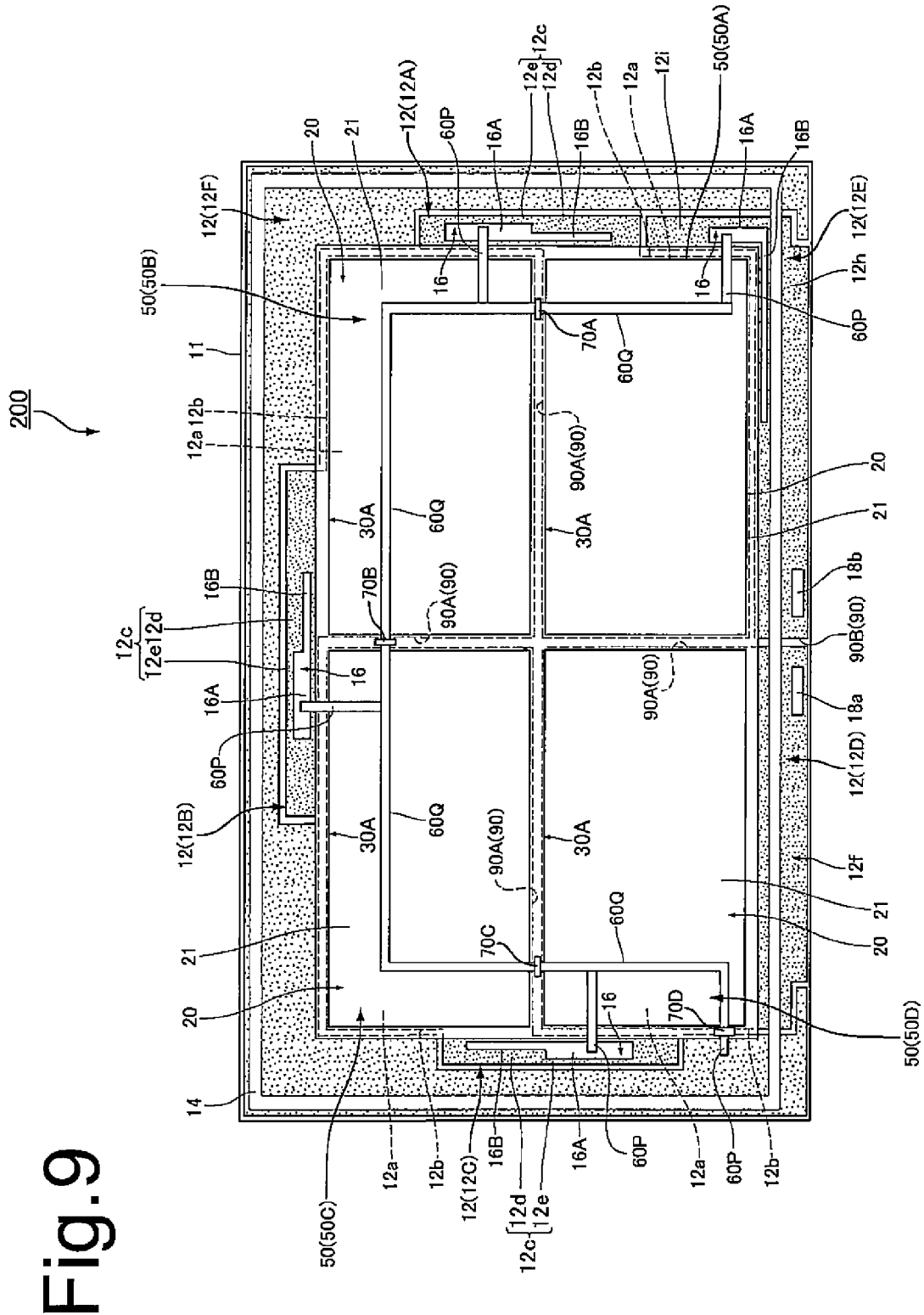
FIG. 9 is a plan view illustrating a part of a second embodiment of a dye-sensitized solar cell element of the invention.

The invention is not limited to the embodiment described above. For example, in the above embodiment, the DSCs 50A to 50D are arranged in a line along the X direction in FIG. 2, but the DSCs 50C and 50D which are a part of the DSCs 50A to 50D are folded back in the middle and the DSC 50A and the DSC 50D are disposed so as to be adjacent to each other as a DSC module 200 illustrated in FIG. 9. Meanwhile, in FIG. 9, the back sheet 80 is omitted. In this case, unlike the DSC module 100, it is not necessary to provide a connecting portion 12*g* between the main body portion 12*a* and the first current extracting portion 12*f* in the transparent conductive layer 12D. For this reason, it is also not necessary to provide the current collecting wiring 17.

Figure 10:
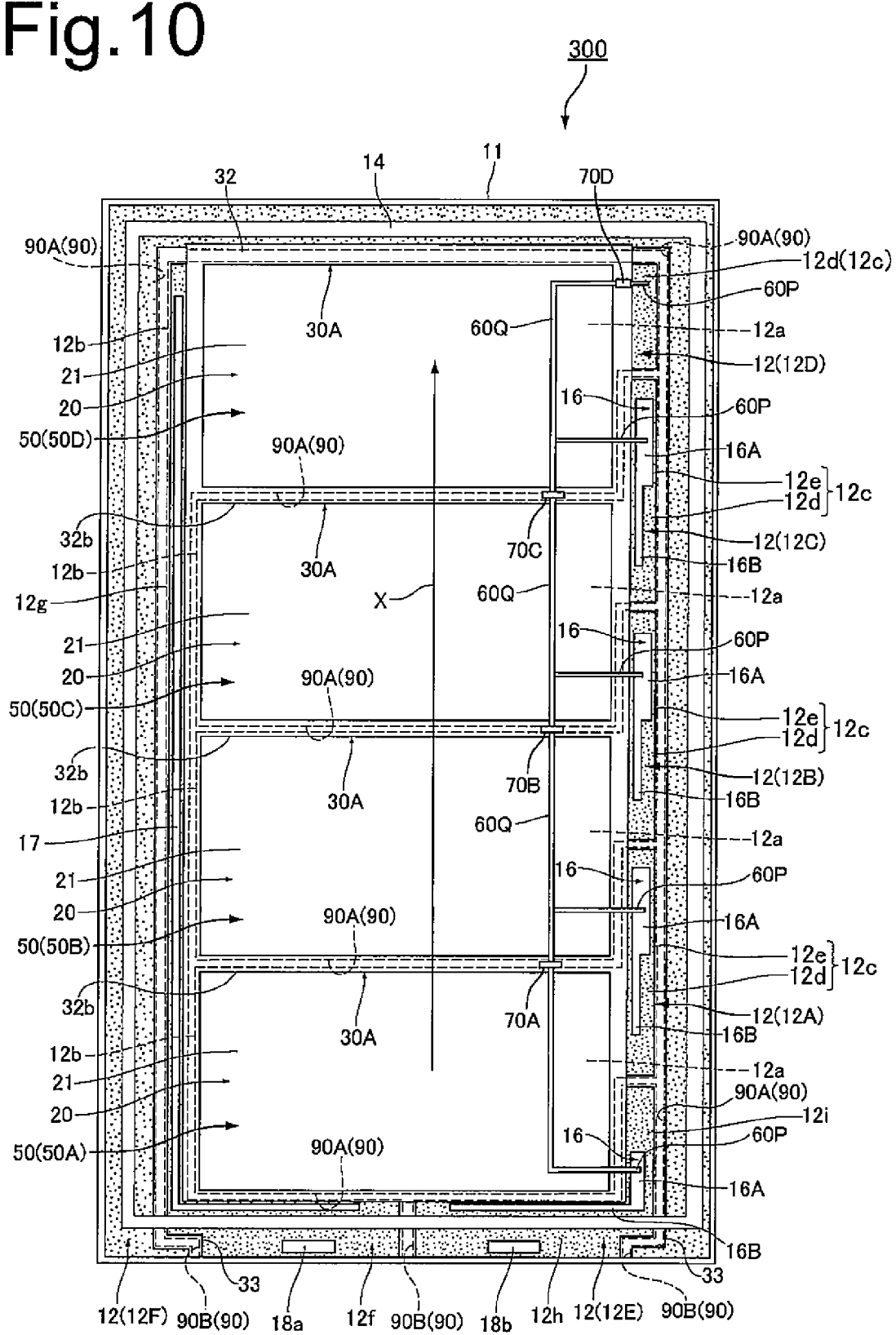
FIG. 10 is a plan view illustrating a part of a third embodiment of a dye-sensitized solar cell element of the invention.

In addition, in the above embodiment, the groove formed along the edge portion of the part excluding the main body portion 12*a* of the transparent conductive layer 12 of the first groove 90A and the second groove 90B which intersects with the coupling portion 14 of the back sheet 80 with the transparent conductive substrate 15 are not covered with the insulating material 33, but it is preferable that at least the second groove 90B be covered with the insulating material 33 as a DSC module 300 illustrated in FIG. 10. Meanwhile, in FIG. 10, the back sheet 80 is omitted. As illustrated in FIG. 10, it is possible for the moisture to penetrate into the space between the back sheet 80 and the transparent conductive substrate 15 through the second groove 90B when at least the second groove 90B intersects with the coupling portion 14. In this case, the penetration of moisture from the outer side of the back sheet 80 into the inner side thereof is sufficiently suppressed since the insulating material 33 enters into at least the second groove 90B and covers also the part excluding the main body portion 12*a* of the transparent conductive layer 12 of the first groove 90A and the edge portion of the second groove 90B. For this reason, it is sufficiently suppressed that the moisture which has penetrated into the space between the back sheet 80 and the transparent conductive substrate 15 enters into the inner side of the sealing portion 30A through the sealing portion 30A. For this reason, it is possible to sufficiently suppress the deterioration of the durability of the DSC module 300.

Furthermore, in the above embodiment, a part of the groove 90 is not covered with the insulating material 33, but it is preferable that the insulating material 33 cover the edge portion of the transparent conductive layer 12 on both sides of the entire groove 90 as well as enter into the entire groove 90 as the DSC module 300 illustrated in FIG. 10. In this case, the moisture cannot penetrate into the groove 90 in the first place, and moisture cannot penetrate into the crack formed on the groove 90 as well, and thus it is possible to even more suppress that the moisture penetrates via the groove 90 since the insulating material 33 covers the edge portion of the transparent conductive layer 12 on both sides of the entire groove 90 as well as enters into the entire groove 90. In addition, the insulating material 33 covers also the edge portion of the transparent conductive layer 12 on both sides of the entire groove 90 and thus it is possible to sufficiently secure the insulation properties between the transparent conductive layers 12 on both sides of the groove 90. In addition, in the DSC module 100, the insulating material 33 also enters into the entire first groove 90A between the transparent conductive layers 12 of the adjacent DSCs 50, and thus it is possible to more suppress the flowing of current between the transparent conductive layers 12, and as a result, it is possible to sufficiently secure the insulation properties. For this reason, it is possible to improve the photoelectric conversion characteristics.

Figure 11:
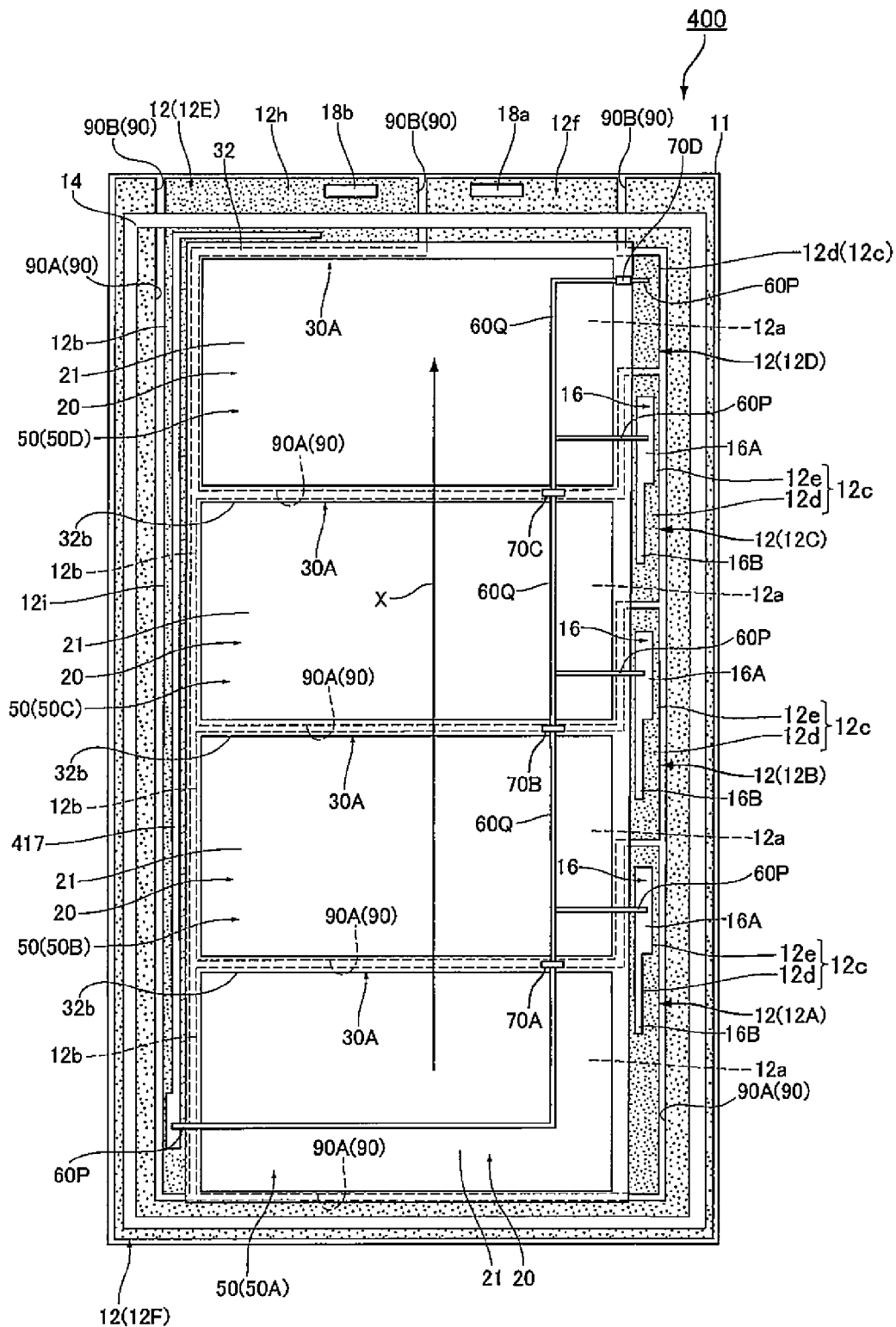
FIG. 11 is a plan view illustrating a part of a fourth embodiment of a dye-sensitized solar cell element of the invention.

Furthermore, in the above embodiment, the first current extracting portion 12f and the second current extracting portion 12h are disposed in the vicinity on the DSC 50A side, but the first current extracting portion 12f and the second current extracting portion 12h may be disposed in the vicinity on the DSC 50D side as illustrated in a DSC module 400 illustrated in FIG. 11. In this case, the first current extracting portion 12f is provided so as to protrude on the side opposite to the DSC 50C with respect to the main body portion 12a of the transparent conductive layer 12D to the outer side of the sealing portion 30A. On the other hand, the second current extracting portion 12h is provided on the side opposite to the DSC 50C with respect to the main body portion 12a of the transparent conductive layer 12D. In addition, the connecting portion 12i as a second connecting portion extends along the transparent conductive layers 12A to 12D, and this connecting portion 12i connects the second current extracting portion 12h with the metal substrate 21 of the counter electrode 20 of the DSC 50A. Specifically, a current collecting wiring 417 is provided on the connecting portion 12i along the connecting portion 12i, and this current collecting wiring 417 is connected with the conductive material 60P extending from the bypass diode 70A. It is possible to achieve space saving while exhibiting excellent photoelectric conversion characteristics by this DSC module 400 as well. Meanwhile, in this case, it is the same as the above embodiment that it is preferable that the resistance value of the connecting portion 12i be equal to or less than the resistance value represented by the following Equation (1).

$$\text{Resistance value} = \text{number of DSC 50 connected in series} \times 120\Omega \quad (1)$$

Figure 12:
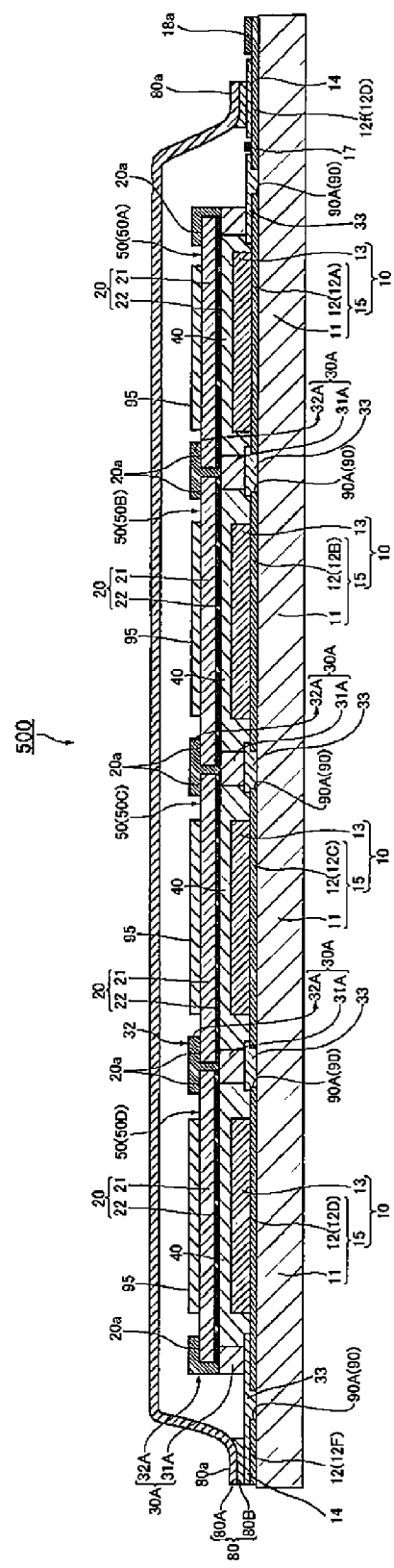
FIG. 12 is an end view of the cut section illustrating a part of a fifth embodiment of a dye-sensitized solar cell element of the invention.

Furthermore, in the above embodiment, the first groove 90A is formed along the edge portion of the main body portion 12a of the transparent conductive layer 12, but the first groove 90A may not be formed along the edge portion of the main body portion 12a of the transparent conductive layer 12 as long as it is present along the external shape of the annular sealing portion 30A as illustrated in FIG. 12. Specifically, the first groove 90A is formed at the position distant on the outer side than the annular sealing portion 30A on the transparent conductive layer 12. Even in this case, the insulating material 33 continuously covers the edge portion of the main body portion 12a as well as enters into the first groove 90A formed along the external shape of the annular sealing portion 30A.

In addition, in the above embodiment, the insulating material 33 and the coupling portion 14 are spaced apart from each other, but it is preferable that they be composed of the same material and integrated as illustrated in FIG. 12. In this case, the insulating material 33 and the coupling portion 14 are composed of the same material and integrated. For this reason, it is possible to prevent the penetration of moisture by being integrated even if the moisture penetrates into the back sheet 80 since the interface is not formed between the coupling portion 14 and the insulating material 33. Consequently, it is possible to exhibit even more excellent durability.

In addition, in the above embodiment, the groove 90 has the second groove 90B, but the second groove 90B may not be necessarily formed.

In addition, in the above embodiment, the widths of the conductive material connecting portion 16A and the conductive material connecting portion 16B of the connecting terminal 16 are set to be constant, but each of the widths of the conductive material connecting portion 16A and the conductive material connecting portion 16B may change along the extending direction of the connecting terminal 16. For example, the width may monotonically increase from the end portion on the farthest side from the conductive material connecting portion 16A of the conductive material non-connecting portion 16B toward the end portion on the closest side thereof, and the width may monotonically increase from the end portion of the conductive material non-connecting portion 16B side of the conductive material connecting portion 16A toward the end portion on the farthest side from the conductive member non-connecting portion 16B. However, the conductive material non-connecting portion 16B is less likely to peel off when each of the widths of the conductive material non-connecting portion 16B and the conductive material connecting portion 16A is constant since the width of the connecting terminal 16 rapidly changes at the boundary between the conductive material non-connecting portion 16B and the conductive material connecting portion 16A.

In addition, in the above embodiment, the conductive material connecting portion 16A and the conductive material connecting portion 16B are provided along the sealing portion 30A, respectively, but these may be formed so as to extend in the direction away from the sealing portion 30A. However, in this case, it is preferable that the conductive material connecting portion 16A be disposed at the position closer to the sealing portion 30A than the conductive material non-connecting portion 16B. In this case, it is possible to more shorten the conductive material 60P.

Alternatively, in the connecting terminal 16 formed on the transparent conductive layers 12A to 12C, the conductive material non-connecting portion 16B may be disposed so as to be orthogonal to the conductive material connecting portion 16A.

Moreover, in a case in which the object of the invention is accomplished by the above first invention and second invention, the width of the conductive material non-connecting portion 16B may be equal to or greater than the width of the conductive material connecting portion 16A.

In addition, in the above embodiment, the second sealing portion 32A is adhered to the first sealing portion 31A, but the second sealing portion 32A may not be adhered to the first sealing portion 31A.

Furthermore, in the above embodiment, the sealing portion 30A is constituted by the first sealing portion 31A and the second sealing portion 32A, but the second sealing portion 32A may be omitted.

In addition, in the above embodiment, the width P of the adhesive portion of the counter electrode 20 with the partitioning portion 31b of the first integrated sealing portion 31 is narrower than the width Q of the adhesive portion of the counter electrode 20 with the annular portion 31a of the first integrated sealing portion 31, but the width P of the adhesive portion may be equal to or more than the width Q of the adhesive portion.

Furthermore, in the above embodiment, the width R of the partitioning portion 31b of the first integrated sealing portion 31 is 100% or more and less than 200% of the width T of the annular portion 31a of the first integrated sealing portion 31, but the width R of the partitioning portion 31b may be less than 100% or 200% or more of the width T of the annular portion 31a of the first integrated sealing portion 31.

Moreover, in the above embodiment, the annular first sealing portions 31A of the adjacent DSCs 50 are integrated, but the annular first sealing portions 31A of the adjacent DSCs 50 may not be necessarily integrated. In other words, the annular first sealing portions 31A may be spaced apart from each other.

Furthermore, in the above embodiment, the back sheet 80 is provided, but the back sheet 80 may not be necessarily provided. In this case, the coupling portion 14 is also not provided in the case of achieving the object of the invention by the first invention described above.

In addition, in the above embodiment, the back sheet 80 is adhered to the transparent conductive layer 12 via the coupling portion 14, but the back sheet 80 is not required to be necessarily adhered to the transparent conductive layer 12 via the coupling portion 14.

Moreover, in the above embodiment, the plurality of DSCs 50 are connected in series but may be connected in parallel.

Figure 13:
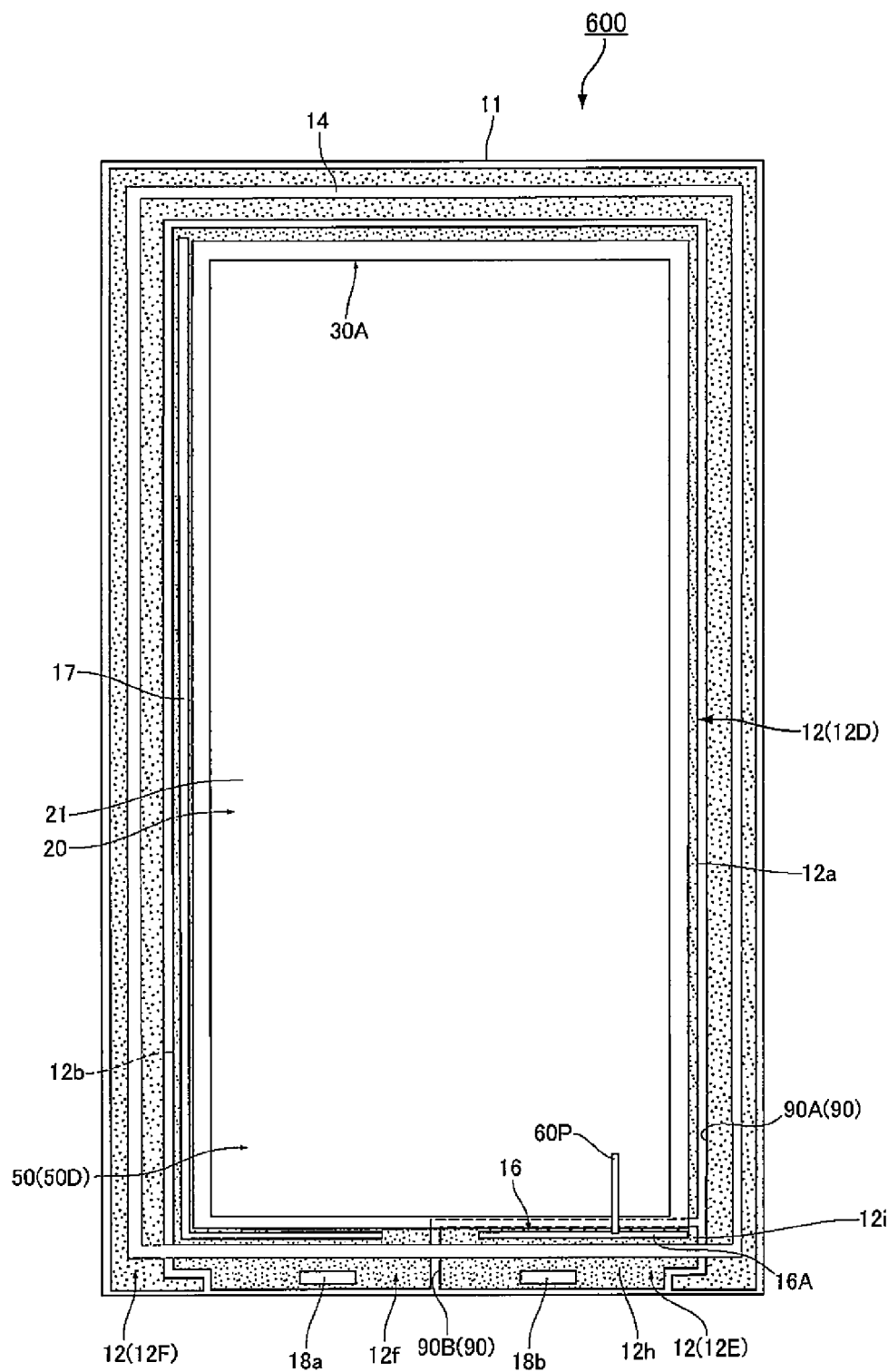
FIG. 13 is a plan view illustrating a part of a sixth embodiment of a dye-sensitized solar cell element of the invention.

Furthermore, in the above embodiment, the plurality of DSCs 50 are used but only one DSC 50 may be used as a dye-sensitized solar cell element 600 illustrated in FIG. 13. Meanwhile, in the dye-sensitized solar cell element 600 illustrated in FIG. 13, the DSC 50A to DSC 50C are omitted, and the connecting terminal 16 provided on the second connecting portion 12i is electrically connected with the metal substrate 21 of the counter electrode 20 of the DSC 50D via the conductive material 60P. In addition, in the dye-sensitized solar cell element 600, the connecting terminal 16 is constituted by only the conductive material connecting portion 16A, and this conductive material connecting portion 16A is disposed between the sealing portion 30A and the coupling portion 14. In other words, the conductive material connecting portion 16A is not disposed at the position facing the side edge portion 12b of the main body portion 12a of the transparent conductive layer 12D of the DSC 50D. For this reason, it is possible to increase the oxide semiconductor layer 13 in size to the space at the part at which the conductive material connecting portion 16A is disposed in the DSC module 100 of the first embodiment. In this case, it is possible to increase the area for power generation in size as well as to effectively utilize the wasted space.

In addition, in the above embodiment, the counter electrode 20 constitutes the counter substrate, but an insulating substrate may be used instead of the counter electrode 20 as a counter substrate. In this case, the structure constituted by the oxide semiconductor layer, the porous insulating layer, and the counter electrode is disposed in the space between the insulating substrate, the sealing portion 30A, and the transparent conductive substrate 15. The structure can be provided on the surface on the counter substrate side of the transparent conductive substrate 15. The structure is constituted by the oxide semiconductor layer, the porous insulating layer, and the counter electrode in order from the transparent conductive substrate 15 side. In addition, the electrolyte is disposed in the space above. The electrolyte is impregnated even into the inside of the oxide semiconductor layer and the porous insulating layer. Here, it is possible to use, for example, a glass substrate or a resin film as the insulating substrate. In addition, it is possible to use the same one as the counter electrode 20 of the above embodiment as the counter electrode. Alternatively, the counter electrode may be constituted by, for example, a porous single layer containing carbon or the like. The porous insulating layer is mainly provided in order to prevent the physical contact of the porous oxide semiconductor layer with the counter electrode and to impregnate the electrolyte thereinto. It is possible to use, for example, a fired body of an oxide as such a porous insulating layer.

Moreover, in a case in which the object of the invention is accomplished by the above second invention, it is not required that the insulating material 33 continuously covers also the edge portion of the main body portion 12a as well as enters into the first groove 90A as long as the configuration requirement of the second invention is met.

EXAMPLES

Hereinafter, the content of the invention will be described more specifically with reference to Examples, but the invention is not limited to the following Examples.

Example 1

First, a laminate obtained by forming a transparent conductive layer composed of FTO having a thickness of 1 μm on a transparent substrate which is composed of glass and has a thickness of 1 mm was prepared. Next, as illustrated in FIG. 3, the groove 90 was formed on the transparent conductive layer 12 by a $CO_2$ laser (V-460 manufactured by Universal Laser Systems Inc.), and the transparent conductive layers 12A to 12F were formed. At this time, the width of the groove 90 was set to 1 mm. In addition, each of the transparent conductive layers 12A to 12C was formed so as to have the main body portion having a quadrangular shape of 4.6 cm×2.0 cm and the protruding portion protruding from the side edge portion of one side of the main body portion. In addition, the transparent conductive layer 12D was formed so as to have the main body portion having a quadrangular shape of 4.6 cm×2.1 cm and the protruding portion protruding from the side edge portion of one side of the main body. In addition, the protruding portion 12c of the three transparent conductive layers 12A to 12C among the transparent conductive layers 12A to 12D was constituted by the projecting portion 12d projecting from the one side edge portion 12b of the main body portion 12a and the facing portion 12e which is extended from the projecting portion 12d and faced the main body portion 12a of the adjacent transparent conductive layer 12. In addition, the protruding portion 12c of the transparent conductive layer 12D was constituted only by the projecting portion 12d projecting from the one side edge portion 12b of the main body portion 12a. At this time, the length of the projecting direction (the direction orthogonal to the X direction in FIG. 2) of the projecting portion 12d was set to 2.1 mm and the width of the projecting portion 12d was set to 9.8 mm. In addition, the width of the facing portion 12e was set to 2.1 mm and the length of the facing portion 12e in the extending direction was set to 9.8 mm.

In addition, the transparent conductive layer 12D was formed so as to have not only the main body portion 12a and the protruding portion 12c but also the first current extracting portion 12f and the connecting portion 12g connecting the first current extracting portion 12f and the main body portion 12a. The transparent conductive layer 12E was formed so as to have the second current extracting portion 12h. At this time, the width of the connecting portion 12g was set to 1.3 mm and the length thereof was set to 59 mm. In addition, when the resistance value of the connecting portion 12g was measured by the four probe method, it was 100Ω.

Next, a precursor of the connecting terminal 16 constituted by the conductive material connecting portion 16A and the conductive material non-connecting portion 16B was formed on the protruding portion 12c of the transparent conductive layers 12A to 12C. Specifically, the precursor of the connecting terminal 16 was formed such that a precursor of the conductive material connecting portion 16A was provided on the facing portion 12e and a precursor of the conductive material non-connecting portion 16B was provided on the projecting portion 12d. At this time, the precursor of the conductive material non-connecting portion 16B was formed so as to be narrower than the width of the conductive material connecting portion 16A. The precursor of the connecting terminal 16 was formed by applying the silver paste ("GL-6000X16" manufactured by FUKUDA METAL FOIL & POWDER Co., LTD.) by screen printing and drying it.

Furthermore, a precursor of the current collecting wiring 17 was formed on the connecting portion 12g of the transparent conductive layer 12D. The precursor of the current collecting wiring 17 was formed by applying the silver paste by screen printing and drying it.

In addition, precursors of the external connecting terminals 18a and 18b for extracting the current to the outside were formed on the first current extracting portion 12f and the second current extracting portion 12h of the transparent conductive layer 12A, respectively. The precursors of the external connecting terminals were formed by applying the silver paste by screen printing and drying it.

Moreover, a precursor of the insulating material 33 was formed so as to enter into the first groove 90A and to cover the edge portion of the transparent conductive layer on both sides of the first groove 90A. The insulating material 33 was formed by applying a paste containing a glass frit by screen printing and drying it. At this time, the width of the edge portion of the transparent conductive layer covered with the insulating material 33 was 0.2 mm from the groove 90.

In addition, in order to fix the back sheet 80, in the same manner as the insulating material 33, a precursor of the annular coupling portion 14 composed of a glass frit was formed so as to surround the insulating material 33 and to pass through the transparent conductive layer 12D, the transparent conductive layer 12E, and the transparent conductive layer 12F. In addition, at this time, the precursor of the coupling portion 14 was formed such that the precursor of the current collecting wiring 17 was disposed on the inner side thereof. In addition, the coupling portion 14 was formed such that the first current extracting portion and the second current extracting portion were disposed on the outer side thereof. The coupling portion 14 was formed by applying a paste containing a glass frit by screen printing and drying it.

Furthermore, a precursor of the oxide semiconductor layer 13 was formed on the main body portion 12a of each of the transparent conductive layers 12A to 12D. The precursor of the oxide semiconductor layer 13 was formed by applying the paste for porous oxide semiconductor layer formation containing titania ("PST-21NR" manufactured by JGC C & C) three times by screen printing and drying it, and then by further applying the paste for porous oxide semiconductor layer formation containing titania ("PST-400C" manufactured by JGC C & C) by screen printing and then drying it.

Next, the precursor of the connecting terminal 16, the precursor of the current collecting wiring 17, the precursors of the external connecting terminals 18a and 18b, the precursor of the insulating material 33, the precursor of the coupling portion 14, the precursor of the insulating material 33, and the precursor of the oxide semiconductor layer 13 were fired at 500° C. for 15 minutes to form the connecting terminal 16, the current collecting wiring 17, the external connecting terminals 18a and 18b, the coupling portion 14, the insulating material 33, and the oxide semiconductor layer 13. At this time, the width of the conductive material connecting portion of the connecting terminal 16 was 1.0 mm and the width of the conductive material non-connecting portion thereof was 0.3 mm. In addition, the length along the extending direction of the conductive material connecting portion was 7.0 mm and the length along the extending direction of the conductive material non-connecting portion was 7.0 mm. In addition, the dimensions of the current collecting wiring 17, the external connecting terminals 18a and 18b, the coupling portion 14, and the oxide semiconductor layer 13 were as follows, respectively.

Current collecting wiring 17: 4 μm in thickness, 200 μm in width, 79 mm in length along the X direction in FIG. 2, and 21 mm in length along the direction orthogonal to the X direction in FIG. 2, External connecting terminals 18a and 18b: 20 μm in thickness, 2 μm in width, and 7 mm in length, Coupling portion 14: 50 μm, 3 mm in width, and Oxide semiconductor layer 13: 13 μm in thickness, 17 mm in length in the X direction in FIG. 2, and 42.1 mm in length in the direction orthogonal to the X direction in FIG. 2

Next, the working electrode was immersed for a whole day and night in a dye solution containing 0.2 mM of a photosensitizing dye consisting of N719 and a mixed solvent prepared by mixing acetonitrile and tert-butanol at a volume ratio of 1:1 as the solvent, and then taken out therefrom and dried, and thus the photosensitizing dye was supported on the oxide semiconductor layer.

Next, the electrolyte composed of 2 M of hexylmethylimidazolium iodide, 0.3 M of n-methylbenzimidazole, 0.1 M of guanidinium thiocyanate in a solvent composed of 3-methoxypropionitrile was coated on the oxide semiconductor layer and dried, and the electrolyte was disposed.

Next, the first integrated sealing portion forming body for forming the first sealing portion was prepared. The first integrated sealing portion forming body was obtained by preparing one sheet of resin film for sealing which had 8.0 cm×4.6 cm×50 μm and was composed of a maleic anhydride modified polyethylene (trade name: Bynel, manufactured by Du Pont) and forming four quadrangular-shaped openings in the resin film for sealing. At this time, the first integrated sealing portion forming body was fabricated such that each opening had a size of 1.7 cm×4.4 cm×50 μm, the width of the annular portion was 2 mm, and the width of the partitioning portion to partition the inner side opening of the annular portion was 2.6 mm.

Thereafter, the first integrated sealing portion forming body was superimposed on the insulating material 33 of the working electrode and then the first integrated sealing portion forming body was adhered to the insulating material 33 of the working electrode by heating to melt.

Next, four sheets of the counter electrodes were prepared. Two counter electrodes of the four sheets of the counter electrodes were prepared by forming the catalyst layer which had a thickness of 5 nm and was composed of platinum on the titanium foil of 4.6 cm×1.9 cm×40 μm by the sputtering method. The rest two counter electrodes of the four sheets of the counter electrodes were prepared by forming the catalyst layer which had a thickness of 5 nm and was composed of platinum on the titanium foil of 4.6 cm×2.0 cm×40 μm by the sputtering method. In addition, another first integrated sealing portion forming body was prepared and this first integrated sealing portion forming body was adhered to the surface facing the working electrode of the counter electrode in the same manner as above.

Thereafter, the first integrated sealing portion forming body adhered to the working electrode was allowed to face the first integrated sealing portion forming body adhered to the counter electrode, and thus the first integrated sealing portion forming bodies were superimposed on each other. The first integrated sealing portion forming bodies were then melted by heating while applying a pressure to the first integrated sealing portion forming bodies in this state. The first sealing portion was formed between the working electrode and the counter electrode in this manner. At this time, the width P of the adhesive portion of the partitioning portion of the first integrated sealing portion with the surface on the transparent conductive substrate side of the counter electrode, the width Q of the adhesive portion of the annular portion of the first integrated sealing portion with the surface on the transparent conductive substrate side of the counter electrode, the width R of the partitioning portion of the first integrated sealing portion, and the width T of the annular portion thereof were as follows, respectively.

P=1.0 mm
Q=2.0 mm
R=2.6 mm
T=2.2 mm

Next, the second integrated sealing portion was prepared. The second integrated sealing portion was obtained by preparing one sheet of resin film for sealing which had 8.0 cm×4.6 cm×50 μm and was composed of maleic anhydride modified polyethylene (trade name: Bynel, manufactured by Du Pont) and forming four quadrangular-shaped openings in the resin film for sealing. At this time, the second integrated sealing portion was fabricated such that each opening had a size of 1.7 cm×4.4 cm×50 μm, the width of the annular portion was 2 mm, and the width of the partitioning portion to partition the inner opening of the annular portion was 2.6 mm. The second integrated sealing portion was bonded to the counter electrode so as to sandwich the edge portion of the counter electrode together with the first integrated sealing portion. At this time, the second integrated sealing portion was bonded to the counter electrode and the first integrated sealing portion by heating the first integrated sealing portion and the second integrated sealing portion to melt while pressing the second integrated sealing portion to the counter electrode.

Next, the desiccant sheet was bonded on the metal substrate of each counter electrode with double-sided tape. The dimensions of the desiccant sheet were 1 mm in thickness×3 cm in length×1 cm in width, and Zeosheet (trade name, manufactured by Shinagawa Chemicals Co., Ltd.) was used as the desiccant sheet.

Next, as illustrated in FIG. 2, the bypass diodes 70A to 70C were respectively fixed to the three partitioning portions of the second integrated sealing portion by applying the low-temperature curing type silver paste (Dotite D500 manufactured by FUJIKURAKASEI CO., LTD.) so as to continue from the terminals at both ends of the bypass diode to the metal substrate 21 of the counter electrode 20. In addition, the bypass diode 70D was fixed on the annular portion of the second integrated sealing portion of the DSC 50D among the four DSCs 50A to 50D by applying the above low-temperature curing type silver paste so as to continue from one terminal of the terminals at both ends of the diode to the counter electrode. In this manner, the conductive material 60Q was formed so as to link the two adjacent bypass diodes with respect to the four bypass diodes 70A to 70D. At this time, the conductive material 60Q was formed by curing the above low-temperature curing type silver paste at 30° C. for 12 hours. RB751V-40 manufactured by ROHM was used as the bypass diode.

In addition, the conductive material 60P was formed by applying the low-temperature curing type silver paste (Dotite D-500 manufactured by FUJIKURAKASEI CO., LTD.) and curing it so as to connect each of the conductive materials 60Q between the bypass diodes and the conductive material connecting portion on the three transparent conductive layers 12A to 12C, respectively. Moreover, for the bypass diode 70A, the conductive material 60P was formed by applying the above low-temperature curing type silver paste and curing it so as to be connected with the conductive material connecting portion on the transparent conductive layer 12E. At this time, the conductive material 60P was formed by curing the above low-temperature curing type silver paste at 30° C. for 12 hours.

Next, the butyl rubber ("Aikameruto" manufactured by Aica Kogyo Co., Ltd.) was coated on the coupling portion 14 with a dispenser while being heated at 200° C. to form a precursor of the adhesive portion. On the other hand, a laminate, which is obtained by laminating a polybutylene terephthalate (PBT) resin film (50 μm in thickness), aluminum foil (25 μm in thickness), and a film (50 μm in thickness) composed of Bynel (trade name, manufactured by Du Pont) in this order, was prepared. Thereafter, the peripheral portion of this laminate 80A was superimposed on the precursor of the adhesive portion 80B, and a pressure was applied thereto for 10 seconds. In this manner, the back sheet 80 constituted by the adhesive portion 80B and the laminate 80A was obtained on the coupling portion 14. The DSC module was obtained in the manner described above.

Example 2

The DSC module was fabricated in the same manner as in Example 1 except that the insulating material 33 composed of a glass frit covered also the edge portion of the transparent conductive layer 12 forming the second groove 90B as well as entered into the second groove 90B. Meanwhile, the edge portion of the transparent conductive layer covered with the insulating material 33 was the part between the groove and the position 0.2 mm away from the groove.

Example 3

The DSC module was fabricated in the same manner as in Example 2 except that the width of the edge portion of the transparent conductive layer 12 covered with the insulating material 33 was set to 0.5 mm from the groove 90.

Comparative Example 1

The DSC module was fabricated in the same manner as in Example 1 except that the insulating material 33 was not formed.

Example 4

The DSC module was fabricated in the same manner as in Example 1 except that the insulating material 33 was formed by printing a paste containing a polyimide resin and firing at 350° C. for 1 hour after forming the connecting terminal 16, the current collecting wiring 17, the external connecting terminals 18a and 18b, the coupling portion 14, and the oxide semiconductor layer 13 and before supporting the photosensitizing dye on the oxide semiconductor layer.

Example 5

The DSC module was fabricated in the same manner as in Example 1 except that the coupling portion was not formed.

Example 6

The DSC module was fabricated in the same manner as in Example 1 except that the insulating material was not formed.

Example 7

The DSC module was fabricated in the same manner as in Example 1 except that the width of the conductive material non-connecting portion was ⅓ time of the width of the conductive material connecting portion.

Example 8

The DSC module was fabricated in the same manner as in Example 1 except that the width of the conductive material non-connecting portion 16 was the same as the width of the conductive material connecting portion 16.

(Characteristic Evaluation)
(Durability 1)

The output ($\eta_0$) was measured for the DSC modules obtained in Examples 1 and 2 and Comparative Example 1. Subsequently, the output ($\eta$) after performing the heat cycle test in conformity to JIS C 8938 was also measured for the DSC modules obtained in Examples 1 and 2 and Comparative Example 1. Thereafter, the retention rate of output (output retention rate) was calculated based on the following Equation. The results are presented in Table 1. Retention rate of photoelectric conversion efficiency (%)=$\eta/\eta_0 \times 100$ (Durability 2)

The photoelectric conversion efficiency ($\eta_0$) was measured for the DSC modules obtained in Examples 4 to 6. Subsequently, the photoelectric conversion efficiency ($\eta$) after performing the heat cycle test in conformity to JIS C 8938 was also measured for the DSC modules obtained in Examples 4 to 6. Thereafter, the retention rate of the photoelectric conversion efficiency (photoelectric conversion retention rate) was calculated based on the following Equation. The results are presented in Table 2. Retention rate of photoelectric conversion efficiency (%)=$\eta/\eta_0 \times 100$ (Connection Reliability)

The connection reliability was evaluated for the DSC modules obtained in Examples 7 and 8 by performing the heat cycle test in conformity to JIS C 8938 and examining the presence or absence of peeling of the connecting terminal from the transparent conductive layer. The results are presented in Table 3. Meanwhile, the heat cycle test 1 was performed 200 cycles when the cycle to raise or lower the environmental temperature from −40° C. to 90° C. was set to 1 cycle.

TABLE 1

|  | Durability 1 Output retention rate (%) | Output (μW) |
|---|---|---|
| Example 1 | 55 | 202 |
| Example 2 | 70 | 209 |
| Example 3 | 75 | 215 |
| Comparative Example 1 | 20 | 193 |

TABLE 2

|  | Durability 2 Photoelectric conversion retention rate (%) |
|---|---|
| Example 1 | 75 |
| Example 4 | 70 |
| Example 5 | 60 |
| Example 6 | 70 |

TABLE 3

|  | Connection reliability Heat cycle test 1 (200 cycles) |
|---|---|
| Example 1 | Absence |
| Example 7 | Absence |
| Example 8 | Presence |

As presented in Table 1, it has been found that the DSC modules of Examples 1 to 3 exhibit a higher output retention rate compared to the DSC module of Comparative Example 1. In addition, it has also been found that the DSC modules of Examples 1 to 3 exhibit a higher output compared to the DSC module of Comparative Example 1.

Based on the above, it has been confirmed that excellent durability is exhibited according to the DSC element of the invention.

EXPLANATIONS OF REFERENCE NUMERALS

11 . . . transparent substrate
12 . . . transparent conductive layer
12a . . . main body portion
12c . . . protruding portion
12e . . . facing portion
13 . . . oxide semiconductor layer
14 . . . coupling portion
15 . . . transparent conductive substrate (conductive substrate)
16 . . . connecting terminal
16A . . . conductive material connecting portion
16B . . . conductive material non-connecting portion
20 . . . counter electrode (counter substrate)
21 . . . metal substrate
30A . . . sealing portion 33 . . . insulating material
50 and 50A to 50D . . . dye-sensitized solar cell
60P and 60Q . . . conductive material
80 . . . back sheet
80B . . . adhesive portion
90 . . . groove
90A . . . first groove
90B . . . second groove
100, 200, 300 and 400, and 500 . . . dye-sensitized solar cell module (dye-sensitized solar cell element)
600 . . . dye-sensitized solar cell element

The invention claimed is:

1. A dye-sensitized solar cell element comprising:
at least one dye-sensitized solar cell, wherein the dye-sensitized solar cell includes
a conductive substrate having a transparent substrate and a transparent conductive layer provided on one surface of the transparent substrate,
a counter substrate facing the conductive substrate and being constituted by a counter electrode,
an oxide semiconductor layer provided on the conductive substrate or the counter substrate, and
an annular sealing portion bonding the conductive substrate and the counter substrate and having an annular first sealing portion provided between the conductive substrate and the counter substrate, the annular sealing portion having a ring shape,
wherein the transparent conductive layer has a main body portion disposed on an inner side of the sealing portion,
a groove formed on the transparent conductive layer, at least a part of the groove having a first groove formed along an external shape of the sealing portion, and
an insulating material continuously covering an edge portion of the main body portion and entering into at least a part of the first groove,
wherein the insulating material is provided over the entire circumference along an external shape of the sealing portion.

2. The dye-sensitized solar cell element according to claim 1, wherein at least a part of the first groove is spaced apart from the sealing portion on an outer side of the sealing portion, and
which comprises a current collecting wiring on the transparent conductive layer of the at least one dye-sensitized solar cell, the current collecting wiring being provided between the sealing portion and the part of the first groove spaced apart from the sealing portion on an outer side of the sealing portion.

3. The dye-sensitized solar cell element according to claim 1, further comprising a back sheet covering the dye-sensitized solar cell on the one surface side of the transparent substrate,
wherein the groove has
the first groove and
a second groove formed along an edge portion of a part excluding the main body portion of the transparent conductive layer and intersecting with a peripheral portion of the back sheet, when the second groove and the peripheral portion of the back sheet are viewed in the direction perpendicular to the one surface of the transparent substrate and
the insulating material also covers an edge portion of a part excluding the main body portion of the transparent conductive layer as well as enters into the second groove.

4. The dye-sensitized solar cell element according to claim 3, wherein an insulating coupling portion is provided between the conductive substrate and the entire circumference of a peripheral portion of the back sheet.

5. The dye-sensitized solar cell element according to claim 4, wherein the insulating material and the coupling portion are composed of the same material and integrated.

6. The dye-sensitized solar cell element according to claim 1, wherein the insulating material covers an edge portion of the transparent conductive layer on both sides of the entire groove as well as enters into the entire groove.

7. The dye-sensitized solar cell element according to claim 1, further comprising a back sheet covering the at least one dye-sensitized solar cell on the one surface side of the transparent substrate,
wherein the back sheet has an adhesive portion making the back sheet adhere to the conductive substrate, and the adhesive portion is spaced apart from the sealing portion.

8. The dye-sensitized solar cell element according to claim 7, wherein an insulating coupling portion is provided on the conductive substrate and the entire circumference of a peripheral portion of the back sheet, and the adhesive portion of the back sheet is adhered to the coupling portion.

9. The dye-sensitized solar cell element according to claim 8, wherein the insulating material is provided between the sealing portion and the conductive substrate.

10. The dye-sensitized solar cell element according to claim 1, comprising a plurality of the dye-sensitized solar cells, the plurality of dye-sensitized solar cells being interconnected electrically in series,
wherein, among the plurality of dye-sensitized solar cells, the dye-sensitized solar cell connected with an adjacent dye-sensitized solar cell further includes a connecting terminal provided on the transparent conductive layer,
the counter substrate has a metal substrate,
the transparent conductive layer has
a main body portion provided on an inner side of the annular sealing portion and
a protruding portion which protrudes from the main body portion to an outer side of the sealing portion and on which the connecting terminal is provided,
the connecting terminal of one dye-sensitized solar cell of two adjacent dye-sensitized solar cells is connected with the metal substrate of the counter substrate of the other dye-sensitized solar cell via a conductive material,
the connecting terminal has
a conductive material connecting portion connected with the conductive material and extending along a fixed direction on an outer side of the sealing portion and
a conductive material non-connecting portion extending along a fixed direction from the conductive material connecting portion on an outer side of the sealing portion, and
a width of the conductive material non-connecting portion is narrower than a width of the conductive material connecting portion.

* * * * *